(12) United States Patent
Itani

(10) Patent No.: US 8,351,756 B2
(45) Date of Patent: Jan. 8, 2013

(54) REPRODUCTION DEVICE

(75) Inventor: Tetsuya Itani, Nara (JP)

(73) Assignee: Panasonic Corporation, Osaka (JP)

( * ) Notice: Subject to any disclaimer, the term of this patent is extended or adjusted under 35 U.S.C. 154(b) by 1132 days.

(21) Appl. No.: 12/094,497

(22) PCT Filed: Nov. 29, 2006

(86) PCT No.: PCT/JP2006/323840
§ 371 (c)(1),
(2), (4) Date: May 21, 2008

(87) PCT Pub. No.: WO2007/063912
PCT Pub. Date: Jun. 7, 2007

(65) Prior Publication Data
US 2009/0290857 A1    Nov. 26, 2009

(30) Foreign Application Priority Data

Nov. 29, 2005    (JP) ................................ 2005-343260

(51) Int. Cl.
*H04L 29/06* (2006.01)
(52) U.S. Cl. ......... 386/200; 386/206; 386/220; 348/477
(58) Field of Classification Search ................. 386/131, 386/206, 220; 348/477
See application file for complete search history.

(56) References Cited

U.S. PATENT DOCUMENTS

| 5,475,425 | A |  | 12/1995 | Przyborski et al. |
| 5,680,454 | A | * | 10/1997 | Mead ............................. 380/204 |
| 6,360,052 | B1 | * | 3/2002 | Ikeda et al. .................... 386/207 |
| 6,370,198 | B1 | * | 4/2002 | Washino .................. 375/240.26 |
| 6,535,608 | B1 | * | 3/2003 | Taira .................................. 381/2 |
| 2003/0164961 | A1 |  | 9/2003 | Daly |
| 2006/0256853 | A1 | * | 11/2006 | Schlockermann et al. ........................ 375/240.03 |
| 2006/0262202 | A1 |  | 11/2006 | Takei |

FOREIGN PATENT DOCUMENTS

| EP | 1 315 138 | 5/2003 |
| EP | 1 511 320 | 3/2005 |
| EP | 1 599 033 | 11/2005 |
| GB | 2 370 932 | 7/2002 |
| JP | 4-97681 | 3/1992 |
| JP | 8-79765 | 3/1996 |
| JP | 8-149466 | 6/1996 |
| JP | 9-508507 | 8/1997 |
| JP | 11-205754 | 7/1999 |
| JP | 2005-80301 | 3/2005 |
| JP | 2006-324808 | 11/2006 |
| WO | 93/14591 | 7/1993 |
| WO | 01/77871 | 10/2001 |

OTHER PUBLICATIONS

European Application No. 06833643.7 Supplementary European Search Report dated Aug. 31, 2010, 6 pages.
European Application No. 06833643.7 Office Action, dated Mar. 23, 2012, 4 pages.

* cited by examiner

*Primary Examiner* — Jeffrey Pwu
*Assistant Examiner* — Michael D Anderson

(57) ABSTRACT

An up-converter (7) performs up-conversion on frame images in a video signal. A pseudo-noise generation circuit (9) generates a pseudo-noise signal, and an adder (10) composites the pseudo-noise signal with the up-converted video signal. As a result, noise having the same resolution as the up-converted frame images (1920 vertical pixels by 1080 horizontal lines) is distributed in the composited frame images, and each piece of noise has a characteristic approximating a characteristic (crest value, amount, or frequency) of noise included in the pre-conversion video signal.

14 Claims, 33 Drawing Sheets

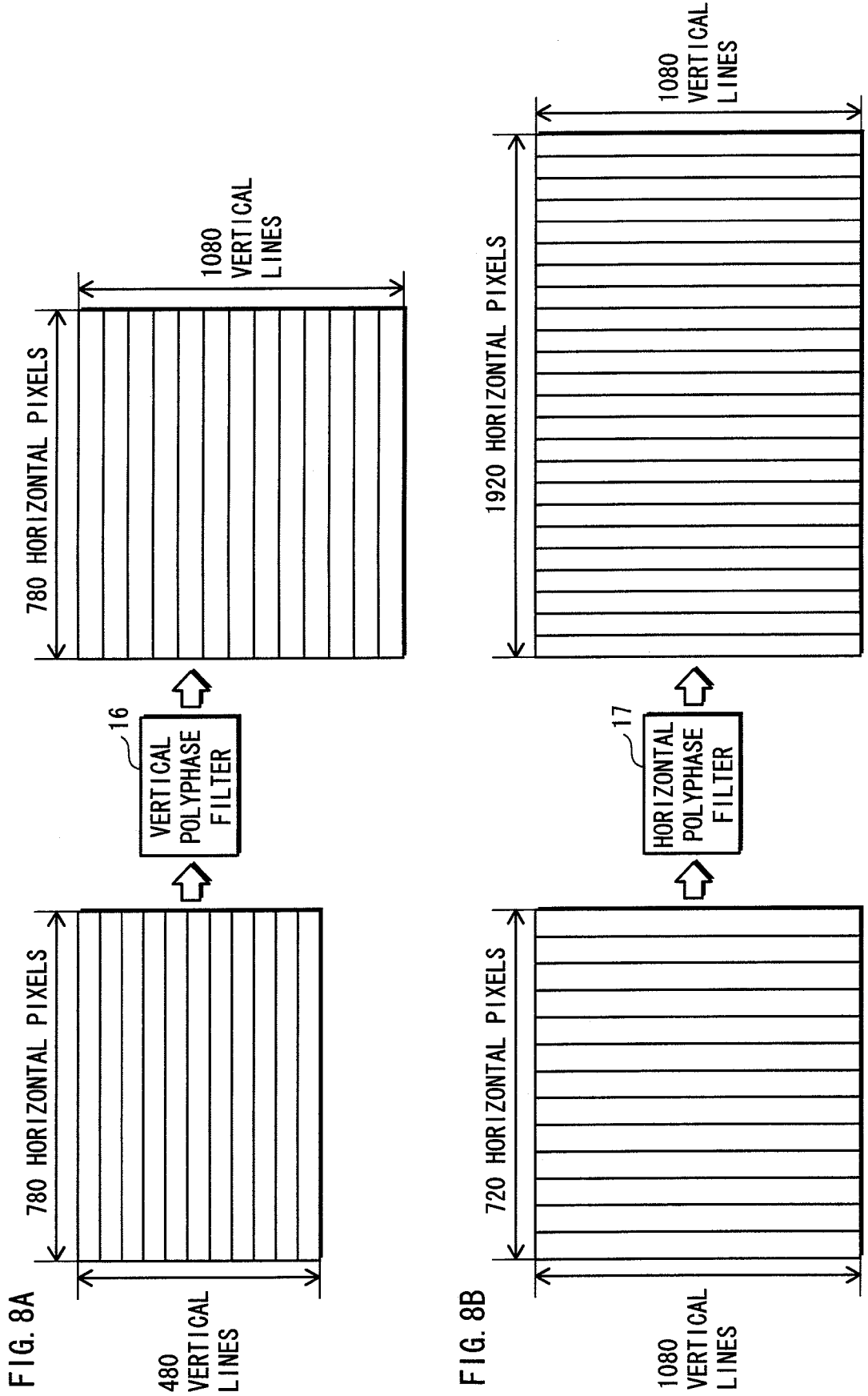

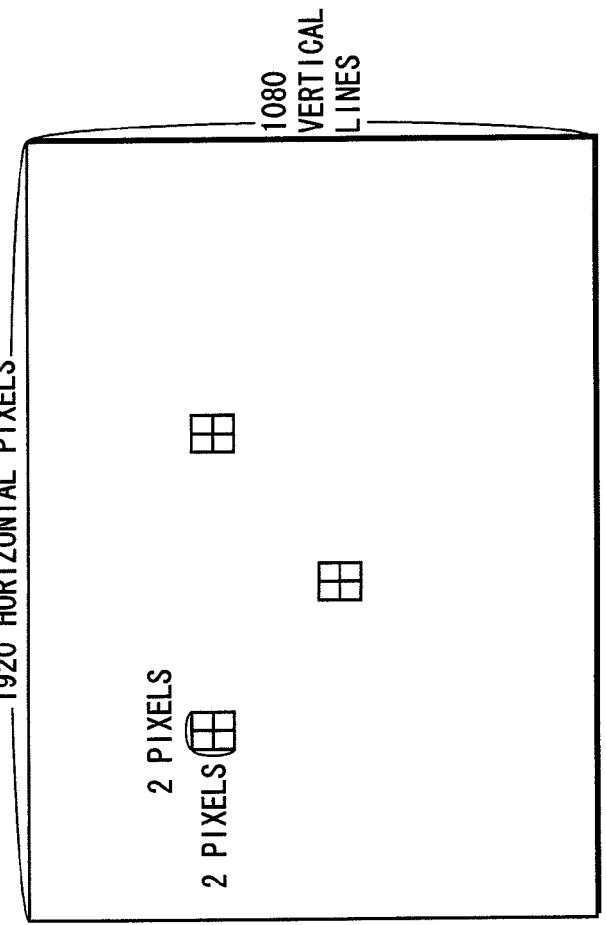
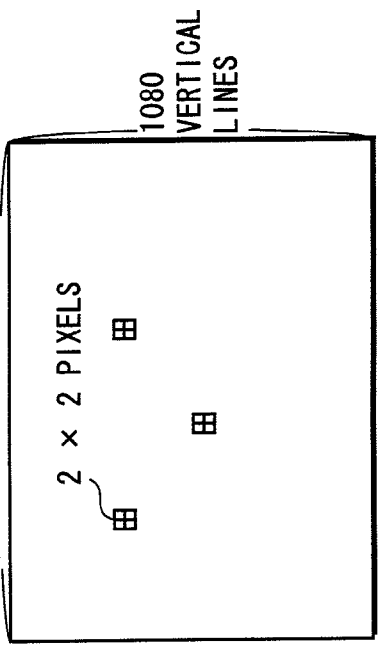
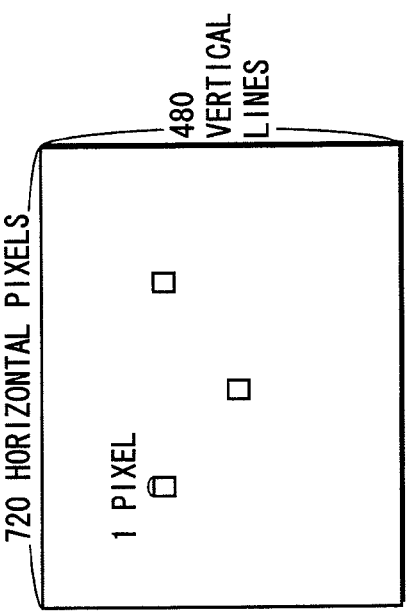
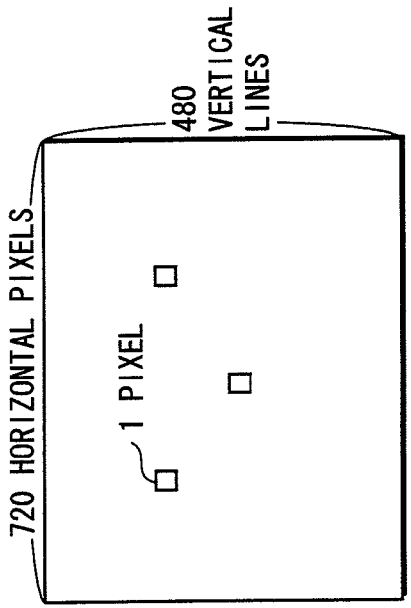
FIG. 12A
FIG. 12B

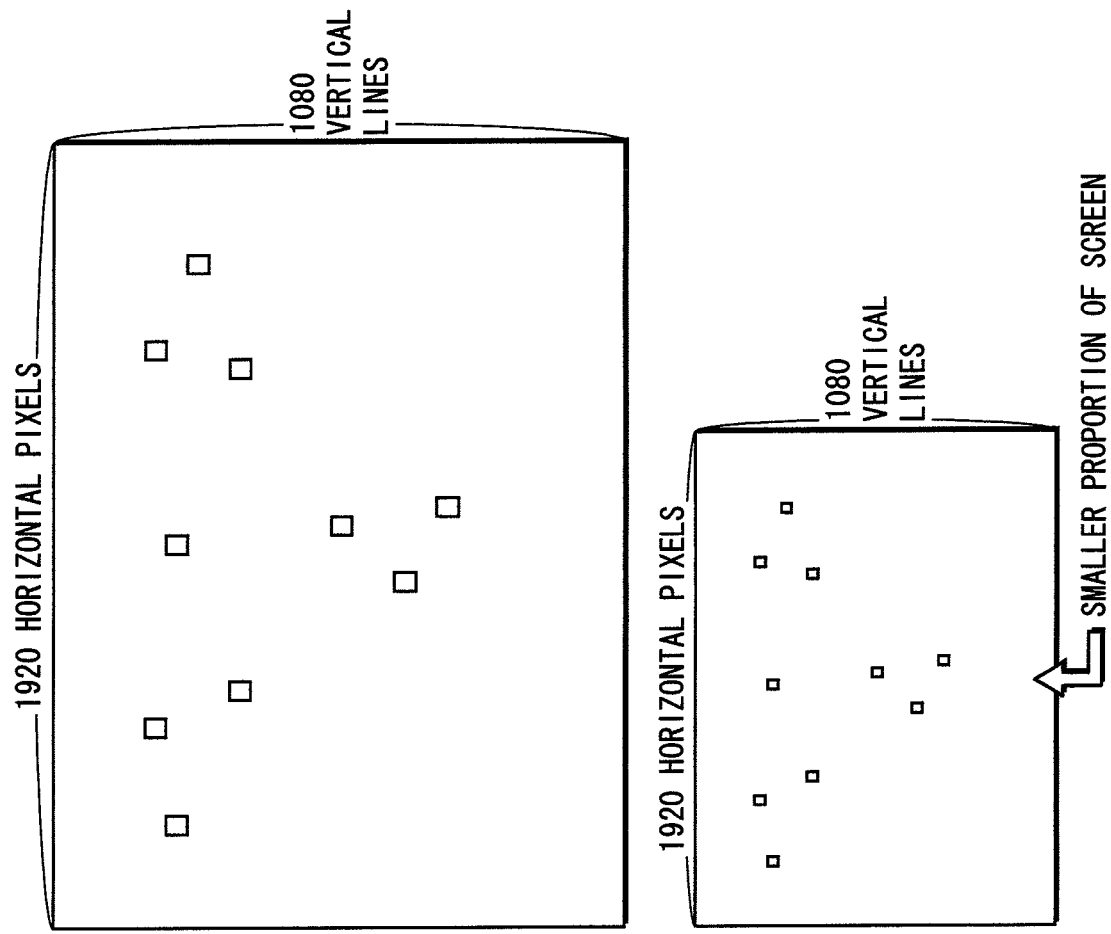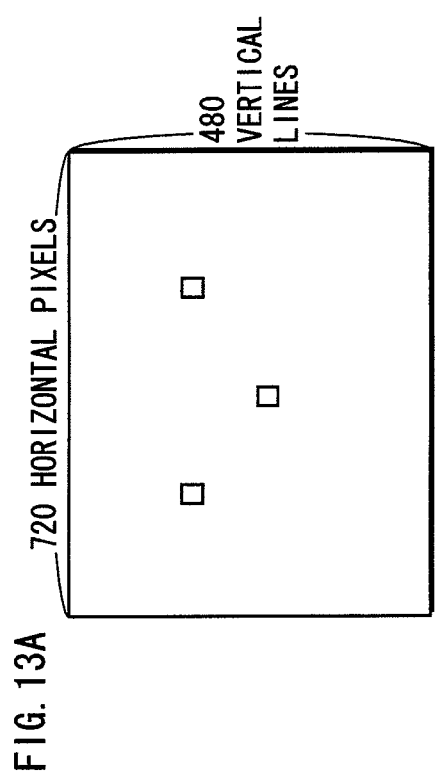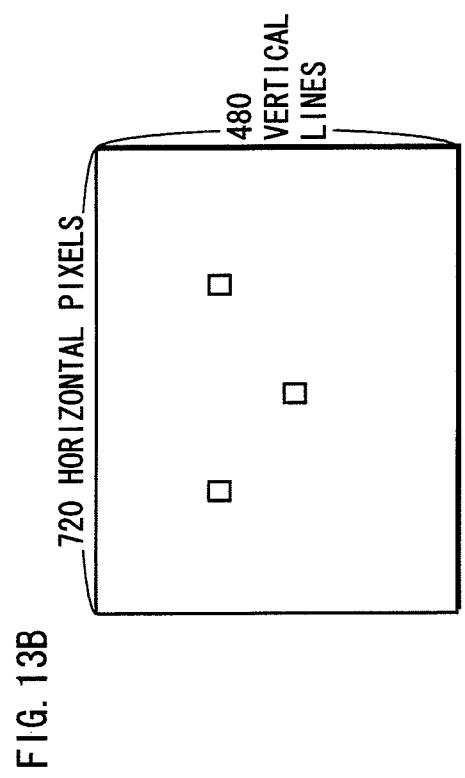
FIG. 13A  FIG. 13B

BLOCKS INCLUDED IN A DIFFERENTIAL SIGNAL

| PEAK VALUE OF BLOCK (1.1) | PEAK VALUE OF BLOCK (2.1) | PEAK VALUE OF BLOCK (3.1) |
|---|---|---|
| PEAK VALUE OF BLOCK (1.2) | PEAK VALUE OF BLOCK (2.2) | PEAK VALUE OF BLOCK (3.2) |
| PEAK VALUE OF BLOCK (1.3) | PEAK VALUE OF BLOCK (2.3) | PEAK VALUE OF BLOCK (3.3) |
| PEAK VALUE OF BLOCK (1.4) | PEAK VALUE OF BLOCK (2.4) | PEAK VALUE OF BLOCK (3.4) |

TARGETED FOR AVERAGING BY THE AVERAGER

MAIN BODY SUBSTRATE OF PLAYBACK DEVICE

REPRODUCTION DEVICE

TECHNICAL FIELD

The present invention belongs to the technical field of resolution conversion technology.

BACKGROUND ART

Resolution conversion technology refers to performing conversion processing on a video signal supplied from a recording medium or a broadcast wave to obtain a higher-resolution video signal, and outputting the video signal to a television, and this technology has gained a greater level of importance due to the widespread use of high-definition television sets in recent years.

For example, if an original video is SD video having 720 horizontal pixels and 420 vertical lines, performing resolution conversion on the original video enables obtaining HD video having 1920 horizontal pixels and 1080 vertical lines. Technology for converting an original video signal into a higher-definition video signal in this way is called "up-conversion". The opposite is called "down-conversion". The invention described in the following patent document is known as a conventional technology for resolution conversion.

The conventional technology described in patent document 1 performs resolution conversion on a video signal having 480 vertical lines (525 scanning lines) in conformity with a standard television signal.

Furthermore, many resolution conversion techniques have been proposed, such as resolution conversion using a statistical technique to increase resolution (see non-patent document 1) and resolution conversion on a video signal having a plurality of frames (see non-patent document 2).

Patent document 1: Japanese Patent Application Publication No. H2-189086 (FIG. 1)

Non-patent document 1: Research on Making an Image High Definition Using a Statistical Technique (Information Technology Research Institute of Nagano Prefecture, Research Report No. 18)

Non-patent document 2: Making an Image High Definition Using a Multi-frame Method (Information Technology Research Institute of Nagano Prefecture, Research Report No. 19)

DISCLOSURE OF THE INVENTION

Problems Solved by the Invention

However, now that large-screen high-definition televisions are widely used, reproduction of film grain is considered important in the resolution conversion technical field such as described above. The "film grain" refers to images of silver salt particles that appear in a video when film is developed. Generally speaking, film is developed by applying silver salt and then exposing the film. When this is done, spots and images of the silver salt particles from the application appear in the developed video. When DVD recording is performed, video is recorded such that film grain appears, in order to reproduce the experience of viewing at a cinema.

Upon examining how film grain is expressed, film grain should be expressed by a small number of pixels such as one or two pixels in the up-conversion, since an HD image represents a high-definition image as described above. This is because there is a tangible sense of high definition when the film grain appears as such a small number of pixels. However, when trying to express film grain in the above up-conversion, film grain that is expressed as one or two pixels in an SD image is expressed as a grouping of a plurality of pixels such as 2 vertical pixels by 3 horizontal pixels in the up-converted HD image. If the film grain is expressed thus as a plurality of pixels, users sense that large film grains are appearing on HD video, and do not have a tangible sense that the video is high definition. In this way, when film grain is expressed as many pixels in up-conversion, a ratio of the film grain to the image as a whole does not change compared to the image before the up-conversion, and there is not a tangible sense of having become high definition due to the up-conversion.

An aim of the present invention is to provide a playback apparatus that gives a user the tangible sense that an image has become high definition due to the up-conversion.

Means to Solve the Problems

In order to solve the above problem, the present invention is a playback apparatus including a conversion unit operable to perform resolution conversion on a frame image in a video signal to obtain a converted video signal; a generation unit operable to generate a pseudo-noise signal including pseudo-noise corresponding to a resolution of the frame image in the converted video signal; and a composition unit operable to composite the pseudo-noise signal generated by the generation unit with the converted video signal.

Effects of the Invention

In the above playback apparatus of the present invention, since the composite unit composites the pseudo-noise signal corresponding to the post-conversion resolution, film grain appears at a resolution of 1080 vertical lines by 1920 horizontal pixels in units of one or two pixels in up-converted HD images. When the film grain appears in units of one or two pixels in a total image resolution of 1080 vertical lines by 1920 horizontal pixels, the size of the film grain in proportion to the total image becomes smaller, giving a user a tangible sense of high-definition video playback due to the up-conversion function of the playback apparatus.

Also, since noise appears in the converted image at a resolution distribution corresponding to the post-conversion resolution, the noise does not appear in the image in an unnatural way. Additionally, noise does not appear in the image in an excessive amount.

Also, although optional, further effects can be achieved by adding the below technical matters to the technical matter (technical matter 1) of the playback apparatus described above, and using specific structures for the playback apparatus.

Technical Matter 2

The playback apparatus of claim 1, wherein the pseudo-noise in the pseudo-noise signal may have a characteristic that approximates a characteristic of noise included in the pre-conversion video signal.

Adding the technical matter described above to a specification of the playback apparatus of the present invention enables a preferred expression of film texture, etc., since noise in the converted image approximates a characteristic of noise included in an original image before the conversion.

Technical Matter 3

The playback apparatus of claim 2 may further include a judgment unit operable to judge a noise level in the pre-conversion video signal, wherein the characteristic of the noise is approximated by control of a crest value of the pseudo-noise according to the noise level that is a judgment result of the judgment unit.

Adding the technical matter described above to a specification of the playback apparatus of the present invention enables creating an atmosphere of the film image even if there is not an exact correspondence with the film grain in the SD video, since the brightness and darkness of the film grain in the original video signal is reflected in crest values of the pseudo-noise. Also, it is possible to simplify the circuit structure to the extent that the positions of the film grains are not reflected, thereby contributing to lower cost.

Technical Matter 4

The playback apparatus of claim 3, wherein the generation unit may generate the pseudo-noise signal by generating a random noise signal in which noise is distributed at a same resolution as the resolution of the frame image in the converted video signal, and multiplying a crest value of the noise in the random noise signal by a coefficient corresponding to the noise level that is the judgment result.

Adding the technical matter described above to a specification of the playback apparatus of the present invention enables smooth development of the playback apparatus of the present invention, since implementation using specific circuit elements such as a multiplier and an adder is possible.

Technical Matter 5

The playback apparatus of claim 3, wherein the noise in the pre-conversion video signal may be a small-amplitude component in a specified frequency band of the video signal, and the judgment unit may be further operable to hold a crest value of a small-amplitude component for each frame image, judge, out of a plurality of noise levels, a noise level that corresponds to the held crest level, and output the corresponding noise level as the judgment result.

Adding the technical matter described above to a specification of the playback apparatus of the present invention enables changing pseudo-noise with temporal precision, since a noise level is held for each frame. This makes the pseudo-noise more realistic.

Technical Matter 6

The playback apparatus of claim 2 may further include a judgment unit operable to judge a noise level in the pre-conversion video signal, wherein the characteristic of the noise is approximated by control of an amount of pseudo-noise in the converted video signal according to the noise level that is a judgment result of the judgment unit.

Adding the technical matter described above to a specification of the playback apparatus of the present invention enables creating the atmosphere of the film image even if there is not an exact correspondence with the film grain in the SD video, since if noise having a large crest value exists in the original video signal before the up-conversion, pseudo-noise having a corresponding crest value is composited with the video signal. Also, it is possible to simplify the circuit structure to the extent that the positions of the film grains are not reflected, thereby contributing to lower cost.

Technical Matter 7

The playback apparatus of claim 6, wherein the generation unit may include a generation sub-unit operable to generate a random noise signal in which noise is distributed at a same resolution as the resolution of the frame image in the converted video signal, and a selection sub-unit operable to select, from among noise crest values in the random noise signal, noise crest values to be included as the pseudo-noise in the pseudo-noise signal, wherein a ratio of selected noise crest values to unselected noise crest values may be varied according to the noise level that is the judgment result of the judgment unit.

Adding the technical matter described above to a specification of the playback apparatus of the present invention enables smooth development of the playback apparatus of the present invention since implementation using specific circuit elements such as a signal generator and a selector is possible.

Technical Matter 8

The playback apparatus of claim 6, wherein the noise in the pre-conversion video signal may be a small-amplitude component in a specified frequency band of the video signal, and may exists in one or more pixel blocks constituting a difference between frame images, and the judgment unit may be further operable to calculate, for each frame image, an average value of a crest value of each pixel block, judge an average value that is a calculated crest value from among a plurality of stages of noise levels, and output the corresponding average value.

Since adding the technical matter described above to a specification of the playback apparatus of the present invention enables generating pseudo-noise in accordance with average values of peak values in each block, even if pseudo-noise is changed in accordance with a differential signal between frame images, a bit rate necessary for the change is not excessively high. This enables developing the actual playback apparatus as a low-cost product.

Technical Matter 9

The playback apparatus of claim 2 may further include a judgment unit operable to judge a noise level in the pre-conversion video signal, and the characteristic of the noise may be approximated by control of a frequency of pseudo-noise according to the noise level that is a judgment result of the judgment unit.

Adding the technical matter described above to a specification of the playback apparatus of the present invention enables creating the atmosphere of the film image even if there is not an exact correspondence with the film grain in the SD image, since if noise having a large crest value exists in the original video signal before up-conversion, pseudo-noise having a corresponding crest value is composited with the video signal. Also, it is possible to simplify the circuit structure to the extent that the positions of the film grains are not reflected, thereby contributing to lower cost.

Technical Matter 10

The playback apparatus of claim 9, wherein the generation unit may generate the pseudo-noise signal by generating a random noise signal in which noise is distributed at a same resolution as the resolution of the frame image in the converted video signal, and corresponding frequencies of individual noise in the random noise signal to the noise level that is the judgment result of the judgment unit.

Adding the technical matter described above to a specification of the playback apparatus of the present invention enables smooth development of the playback apparatus of the present invention, since implementation using specific circuit elements such as a signal generator and a selector is possible.

Technical Matter 11

The playback apparatus of claim 9, wherein the pre-conversion video signal may be a signal that has been compressed by, for each frame, selecting one of intra-frame compression and inter-frame compression, and decoded, and during a continuous series of inter-frame compressed frames, the judgment unit may hold a noise level judged for an intra-frame compressed frame.

Intra-frame coding (I-picture), though having a low compression efficiency, has a frequency characteristic that is superior to other frames, and has retained a large quantity of small-amplitude signal component that is noise and that was included in the video signal before compression. Since a large amount of this small-amplitude signal component is likely to be due to film grain, when pseudo-noise is generated in accordance with the small-amplitude signal in the intra-frame compression frame, the film grain of the original image can be faithfully reproduced.

Technical Matter 12

The playback apparatus of claim 1 may further include a removal unit operable to remove noise included in the pre-conversion video signal, and the composite unit may composite the pseudo-noise with the converted video signal from which the noise has been removed.

Since the original composite of the pseudo-noise is performed after removing noise from the original video, the amount of noise is not excessive, and uncompressed digital audio can be reproduced while preserving clarity of the playback video.

Technical Matter 13

The playback apparatus of claim 1, wherein user selection of one of a first mode in which film texture is reproduced and a second mode in which film texture is not reproduced may be received and set as an operation mode of the playback apparatus, and the compositing of the pseudo-noise by the composition unit may be performed when the first mode has been set as the operation mode.

Since the pseudo-noise composite is performed after the user selects whether to reproduce film texture, even an excessive amount of display noise will not lead to a product complaint.

BRIEF DESCRIPTION OF THE DRAWINGS

FIG. 8A shows a frame image before and after conversion by a vertical polyphase filter 16, and FIG. 8B shows a frame image before and after conversion by a horizontal polyphase filter 17;

FIG. 12A contrasts how an SD image containing noise changes when up-conversion is performed on the SD image, and FIG. 12B shows the SD image of FIG. 12A before the up-conversion and an exemplary display of an HD image after the up-conversion when displayed on a television of the same size;

FIG. 13A contrasts how an SD image changes when noise has been removed from the SD image and a pseudo-noise signal has been added, and FIG. 13B shows the SD image before the up-conversion of FIG. 13A and an exemplary display of an HD image after up-conversion when displayed on a television of the same size;

Figure 1:
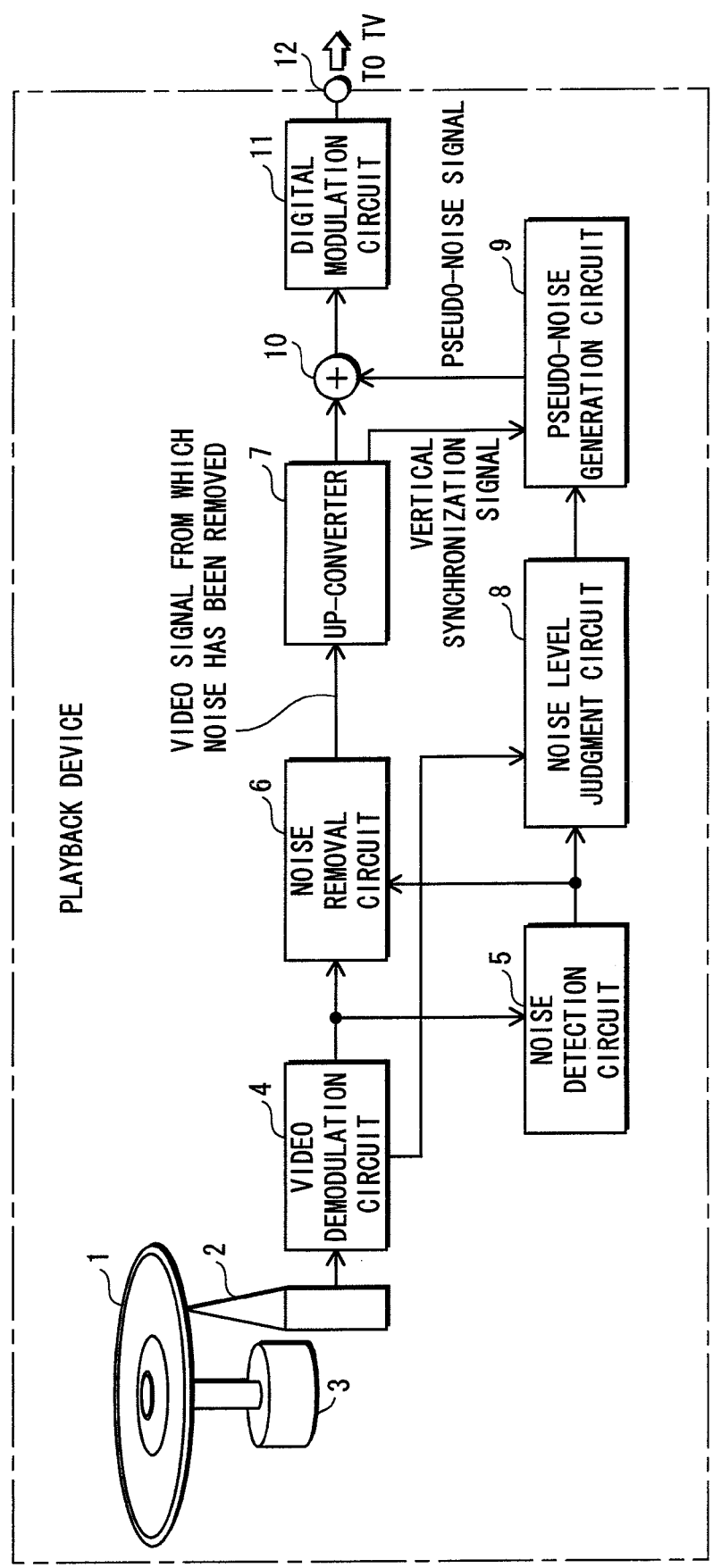
FIG. 1 shows an internal structure of a playback apparatus pertaining to embodiment 1.

DESCRIPTION OF THE CHARACTERS 1 optical disk
2 optical pickup unit 3 motor
4 video demodulation circuit
5 noise detection circuit
6 noise removal circuit
7 up-converter
8 noise level judgment circuit
9 pseudo-noise generation circuit
10 adder
11 digital modulation circuit
12 terminal
13 band-pass filter
14 limiter
15 8-line memory
16 vertical polyphase filter
17 horizontal polyphase filter
18 delay memory
19 peak hold circuit
20 leveler circuit
21 random noise generation circuit
22 multiplier
31 reception antenna
32 tuner
35 noise detection circuit
37 up-converter
38 noise level judgment circuit
39 pseudo-noise generation circuit
41 frame memory
42 subtracter
43 vertical polyphase filter
44 horizontal polyphase filter
45 delay memory
46 block specification circuit
47 intra-block peak hold circuit
48 averaging circuit
50 random noise generation circuit
51 switch
52 switch control circuit
64 video demodulation circuit
65 noise detection circuit
68 noise level judgment circuit
69 pseudo-noise generation circuit
71 frame memory
72 average value circuit
73 hold circuit
74 switch control circuit
75 level 1—random noise generation circuit
76 level 2—random noise generation circuit
77 level 3—random noise generation circuit
78 level 4—random noise generation circuit
79 switch

BEST MODE FOR CARRYING OUT THE INVENTION

Embodiment 1

The following describes an embodiment of a playback apparatus pertaining to the present invention. The playback apparatus of the present invention can be industrially produced in accordance with the internal structure shown in FIG. 1.

Figure 2:
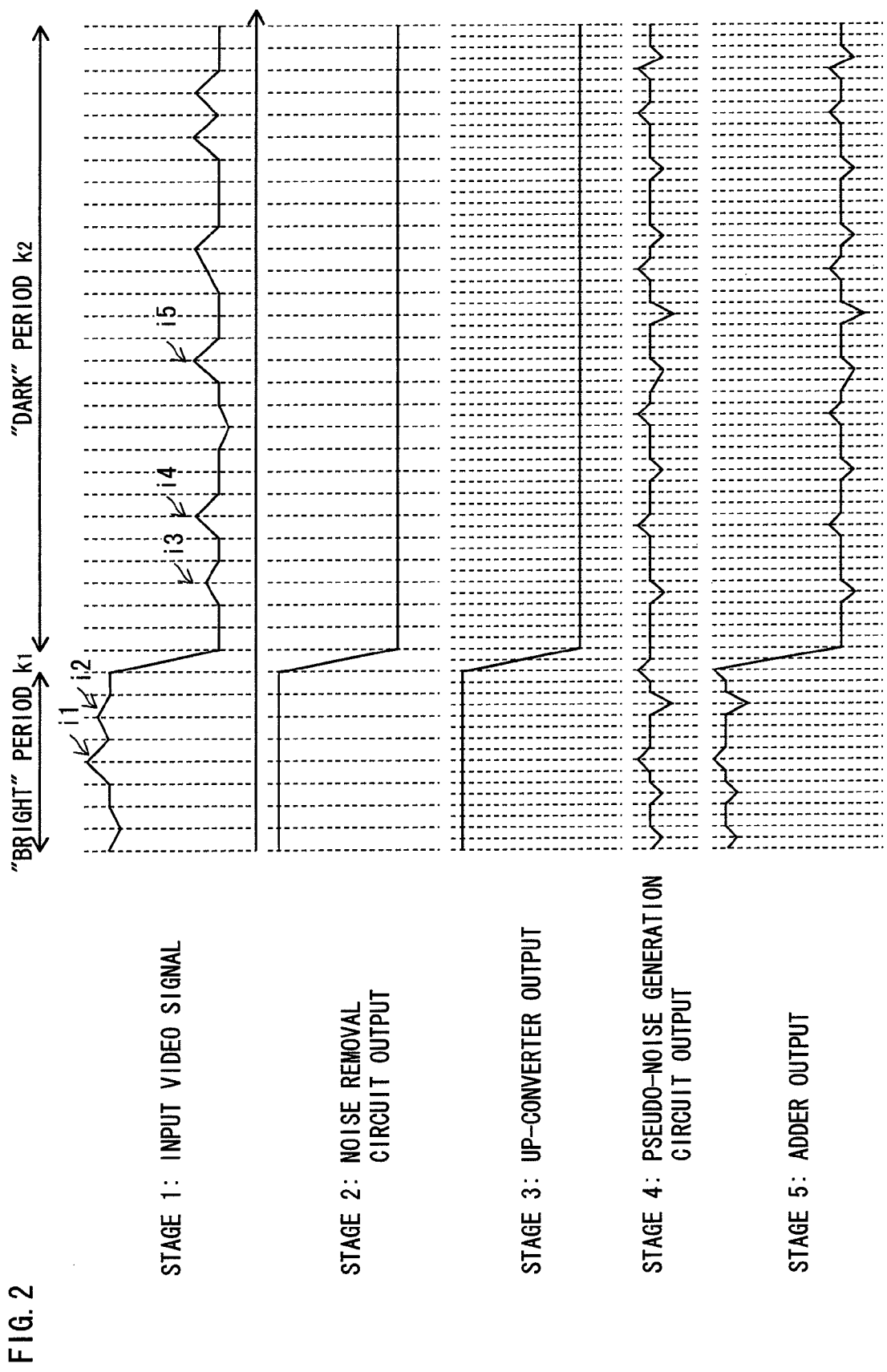
FIG. 2 is a timing chart showing changes in video signals that are output from constituent elements of the playback apparatus.

FIG. 1 shows an internal structure of a playback apparatus pertaining to embodiment 1. In FIG. 1, the playback apparatus is constituted from an optical disk 1, an optical pickup unit 2, a motor 3, a video demodulation circuit 4, a noise detection circuit 5, a noise removal circuit 6, an up-converter 7, a noise level judgment circuit 8, a pseudo-noise generation circuit 9, an adder 10, a digital modulation circuit 11, and a terminal 12. FIG. 2 is a timing chart showing changes in video signals that are output from constituent elements of the playback apparatus pertaining to embodiment 1. The constituent elements of the playback apparatus are described below with reference to the timing chart.

1. Optical Disk 1

A video signal is recorded on the optical disk 1. The video signal recorded on the optical disk 1 has been compressed according to the MPEG-2 system (ITU-T Recommendation H.262/ISO/IEC13818-2).

2. Optical Pickup Unit 2

The optical pickup unit 2 converts the signal recorded on the optical disk 1 into an electronic signal. Output from the optical pickup unit 2 is demodulated by the video demodulation circuit 4 and output as a video signal along with a synchronization signal necessary for playback.

3. Motor 3

The motor 3 rotates the optical disk 1 at a speed suitable for playback.

4. Video Demodulation Circuit 4

The video demodulation circuit 4 performs error correction and the like on the output from the optical pickup unit 2, and demodulates the original video signal and the synchronization signal necessary for video signal playback. The video signal obtained from the demodulation is input to the noise removal circuit 6 and the noise detection circuit 5. As described later, since the present playback apparatus is for transmitting uncompressed frame images through an HDMI transmission channel to a television, the present playback apparatus performs decoding processing on the frame images encoded according to the MPEG-2 encoding system, obtains a video signal including the frame images, and outputs the video signal. For this reason, a demultiplexer and a video decoder necessary for decoding the frame images encoded according to the MPEG-2 encoding system are implemented in the video demodulation circuit 4.

5. Noise Detection Circuit 5

The noise detection circuit 5 detects noise included in the original video signal. The noise in the video signal here refers to small-amplitude signals in specified components. Components of video signals include a luminance component area and a chrominance component area, and the small-amplitude components in these areas are noise. The noise contains both noise originating in the film grain and noise that naturally appears in the filming system or recording system. This is because both appear as display garbage when the video signal is played back. The noise detection circuit 5 measures the amplitude of the small-amplitude signals in both areas, and outputs a noise value corresponding to the measured amplitude.

6. Noise Removal Circuit 6

The noise removal circuit 6 removes the small-amplitude signal component that is noise by subtracting the output of the noise detection circuit 5 from the original video signal output from the video demodulation circuit 4. After the removal, the resulting signal is input to the up-converter 7. Stages 1 and 2 of FIG. 2 show a contrast between the video signal before the removal is performed by the noise removal circuit 6, and the video signal after the noise removal. In FIG. 2, the horizontal axis is a time axis, and grids of dotted lines indicate periods of displaying one pixel in the video signal. The vertical axis shows a luminance level of the pixel. Unless otherwise stated, the reference notations of Stages 1 and 2 are used for the video signals and other types of signals. Also, the signal of Stage 1 is used throughout the present description as a specific example of a video signal. FIG. 2 shows one line of a frame image, and in particular depicts the luminance component that changes from a bright level to a dark level. Therefore, the video signals in Stages 1 and 2 include a period k1 in which the luminance level is "bright", a period k2 in which the luminance level is "dark", and a point of transition between the two periods. In Stage 1, the small-amplitude waveforms i1, i2, i3, and i4 in such periods are noise. As shown in Stage 2, the noise is removed when the signal passes through the noise removal circuit 6.

7. Up-Converter 7

The up-converter 7 converts the output of the noise removal circuit 6 into a video signal having a higher resolution. Specifically, the signal is converted so as to have a resolution of 1080 vertical lines and 1920 horizontal pixels. Stage 2 of FIG. 2 shows the video signal before the up-conversion, and Stage 3 shows the video signal after the up-conversion. Grid spacing in Stage 3 is denser than in Stage 2. This indicates that an image up-converted by the up-converter 7 is expressed with use of a larger number of pixels.

8. Noise Level Judgment Circuit 8

The noise level judgment circuit 8 receives an input of the output of the noise detection circuit 5, and outputs a signal indicating one of four stages of noise level in accordance with an amount of noise.

9. Pseudo-Noise Generation Circuit 9

The pseudo-noise generation circuit 9 generates, in accordance with a noise level input, pseudo-noise having the same resolution as the output of the up-converter 7. Here, the "noise level input" refers to a level signal output from the noise level judgment circuit 8, and represents a noise level of the original video signal. In the pseudo-noise generation circuit 9, crest values of pseudo-noise to be generated depend on the noise level of the original video signal.

The output from the up-converter 7 has a resolution of 1080 vertical lines and 1920 horizontal pixels, and the output from the pseudo-noise generation circuit 9 has the same resolution distribution. Stages 3 and 4 in FIG. 2 show a contrast between a video signal targeted for noise generation and a pseudo-noise signal generated by the pseudo-noise generation circuit 9. The pseudo-noise signal of Stage 4 is displayed on the same grid as Stage 3. This is to represent that the noise signal has the same distribution resolution as the video signal after the up-conversion.

10. Adder 10

The adder 10 adds the output of the up-converter 7 to the output of the pseudo-noise generation circuit 9. Stage 3 of FIG. 2 shows the video signal before the addition, and Stage 4 shows the pseudo-noise signal obtained as a result of the addition. Stage 5 shows a video signal to which the pseudo-noise signal has been added. Accordingly, as shown in Stage 5 of FIG. 2, output of the adder 10 includes noise (the small-amplitude signal component) having a frequency component that is higher than the frequency component of the up-converted original video signal. In the pseudo-noise generation circuit 9, since crest values of pseudo-noise to be generated depend on the noise level of the original video signal, the amount of pseudo-noise to be added depends on the size of the small-amplitude signal component that is noise included in the original video.

11. Digital Modulation Circuit 11

The digital modulation circuit 11 modulates, and converts into a suitable format for transmission, the output of the adder 10. The output of the adder 10 thus acquired is modulated by the digital modulation circuit 11 into an HDMI-format digital video signal. The video signal is output by the terminal 12 and displayed on a monitor that is not depicted.

12. Terminal 12

The terminal 12 is compliant with HDMI (High Definition Multimedia Interface) standards, and includes a serial transmission channel for intercommunication regulated by both standards VESA/E-DDC and EIA/CEA 861-B, in addition to a digitally modulated video signal transmission channel.

Details of the Noise Detection Circuit 5

Figure 3:
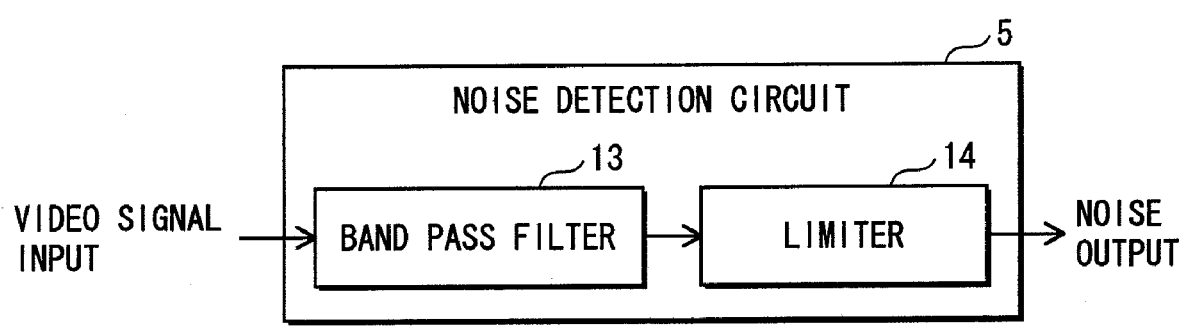
FIG. 3 shows an internal structure of a noise detection circuit 5 pertaining to embodiment 1.
Figure 4:
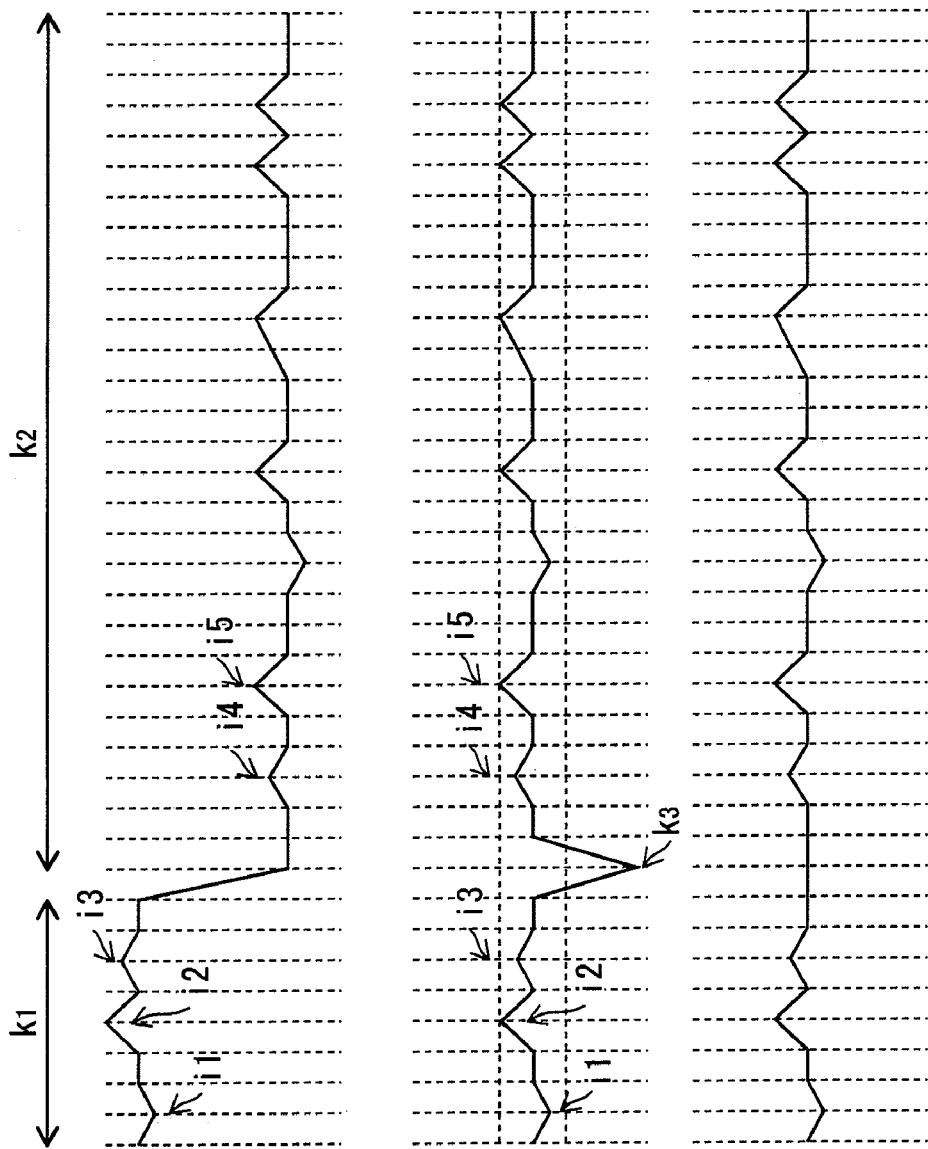
FIG. 4 is a timing chart showing a contrast between a signal input to the noise detection circuit 5 and signals output from constituent elements.

The following describes an internal structure of the noise detection circuit 5 with reference to FIG. 3. FIG. 3 shows the internal structure of the noise detection circuit 5 pertaining to embodiment 1. As shown in FIG. 3, the noise detection circuit 5 is constituted from a band pass filter 13 and a limiter 14. FIG. 4 is a timing chart showing a contrast between a signal input to the noise detection circuit 5 and signals output from the constituent elements. Hereinafter, the noise detection circuit 5 is described with reference to the timing chart. Other referenced drawings are characteristic drawings FIGS. 5 and 6.

Detail 1: Band Pass Filter 13

Figure 5:
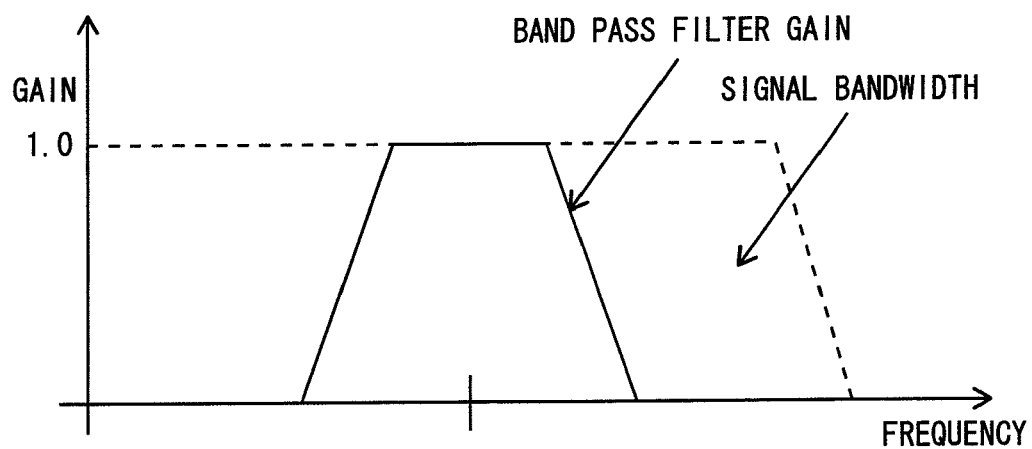
FIG. 5 shows a characteristic of a band pass filter 13 pertaining to embodiment 1.

The original video signal before conversion that has been demodulated by the video demodulation circuit 4 is input to the band pass filter 13. FIG. 5 shows a characteristic of the band pass filter of the playback apparatus pertaining to embodiment 1. The horizontal axis is the frequency axis, and the vertical axis shows the frequency gain. The band pass filter 13 has a characteristic of transmitting only the midrange of input video signals. Since noise in the original video signal component is mainly distributed in the midrange, the band pass filter only transmits that component. The video signal that passed through the band pass filter 13 is input to the limiter 14.

Stages 1 and 2 of FIG. 4 show a contrast between the video signal input to the band pass filter 13 and the output therefrom at the time of the input. In Stage 1, the peaks i1, i2, i3, i4, and i5 in periods k1 and k2 are noise. Since the video signal passes through the band pass filter 13, the noise and the transition point k3 between period k1 and period k2 appear in the output signal of the band pass filter 13.

Detail 2: Limiter 14

Figure 6:
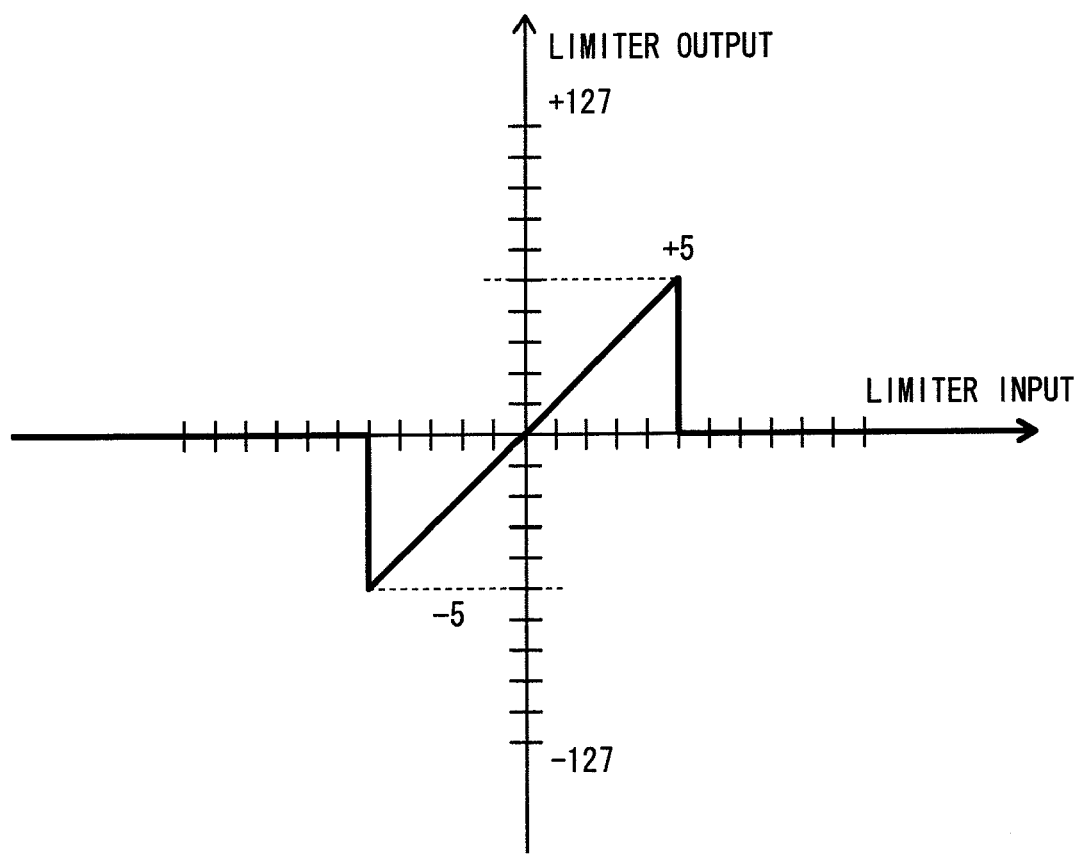
FIG. 6 shows a characteristic of a limiter 14 pertaining to embodiment 1.

The limiter 14 transmits only the small-amplitude component in the video signal, and does not transmit other components. This is because noise mainly has a small amplitude. FIG. 6 shows a characteristic of the limiter of the playback apparatus pertaining to embodiment 1. The horizontal axis shows the output of the band pass filter 13, and is represented in bit values. The vertical axis shows the output of the limiter 14 with respect to the output of the band pass filter 13. Accordingly, the band pass filter output can have ±127 values, and of such values, the limiter only transmits signal components having values of ±5 or less.

In other words, the output of the limiter 14 includes only the extracted small-amplitude signal component that is noise included in the original video signal, and the output from the noise detection circuit 5 that was obtained in this way is input to the noise removal circuit 6 and the noise level judgment circuit 8. Stages 2 and 3 of FIG. 4 show a contrast between the signal input to the limiter 14 and a signal output therefrom. Here, the small-amplitude component of Stage 2, that is, a signal component less than or equal to a limit value indicated by the dotted lines of FIG. 6, is output of the limiter and, as shown in Stage 3, output from the noise detection circuit 5.

This completes the description of the details of the noise detection circuit 5.

Details of the Up-Converter 7

Figure 7:
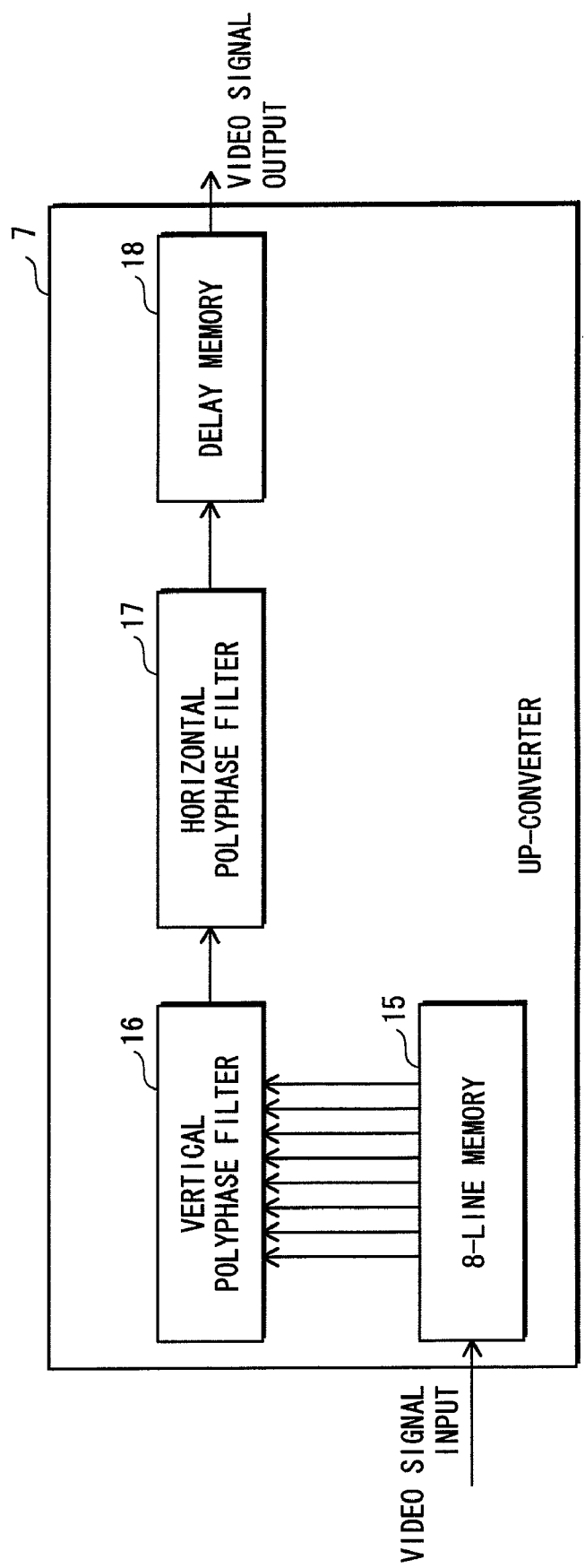
FIG. 7 shows an internal structure of an up-converter 7 pertaining to embodiment 1.

The following describes the details of the up-converter 7 with reference to FIG. 7. FIG. 7 shows an internal structure of the up-converter 7 of the playback apparatus pertaining to embodiment 1. As shown in FIG. 7, the up-converter 7 is constituted from an 8-line memory 15, a vertical polyphase filter 16, a horizontal polyphase filter 17, and a delay memory 18.

Detail 1: 8-Line Memory 15

The 8-line memory 15 includes eight line memories. Such line memories are connected in a series, and each line memory corresponds to one horizontal line in a video signal output from the noise removal circuit 6. Also, output of the line memories is input to the vertical polyphase filter 16.

Detail 2: Vertical Polyphase Filter 16

The vertical polyphase filter 16 receives an input of eight video signals, which are a 1-horizontal line delay video signal, a 2-horizontal line delay video signal, a 3-horizontal line delay video signal, a 4-horizontal line delay video signal, a 5-horizontal line delay video signal, a 6-horizontal line delay video signal, a 7-horizontal line delay video signal, and an 8-horizontal line delay video signal. The vertical polyphase filter 16 performs vertical interpolation on these eight video signals, converts the original video signal from 480 vertical lines to 1080 vertical lines, and outputs the converted video signal to the horizontal polyphase filter 17. FIG. 8A shows a frame image before and after conversion by the vertical polyphase filter 16. As shown in FIG. 8A, the resolution of the original video signal, 480 vertical lines and 720 horizontal pixels, is converted into the high definition video signal of 1080 vertical lines and 720 horizontal pixels. Here, generating one line based on the eight lines before and after is done to generate lines that are not in the original video with use of correlations between the lines.

Detail 3: Horizontal Polyphase Filter 17

The horizontal polyphase filter 17 includes an 8-tap polyphase filter, performs horizontal interpolation, converts the 720 horizontal pixels of the original video signal into 1920 pixels, and outputs the converted signal to the delay memory 18. FIG. 8B shows a frame image before and after conversion by the horizontal polyphase filter 17. As shown in FIG. 8B, the 1080 vertical lines and 720 horizontal pixels of the original video signal are converted into the high-definition video signal of 1080 vertical lines and 1920 horizontal pixels.

Detail 4: Delay Memory 18

The delay memory 18 provides a delay of a predetermined time to the output from the horizontal polyphase filter 17. In regards to this delay, there is precisely one frame of delay from the input to the output of the video signal on which the resolution conversion has been performed. During the delay, a vertical synchronization signal of the output video is output to the pseudo-noise generation circuit 9.

This concludes the description of the up-converter 7.

Details of the Noise Level Judgment Circuit 8

Figure 9A:
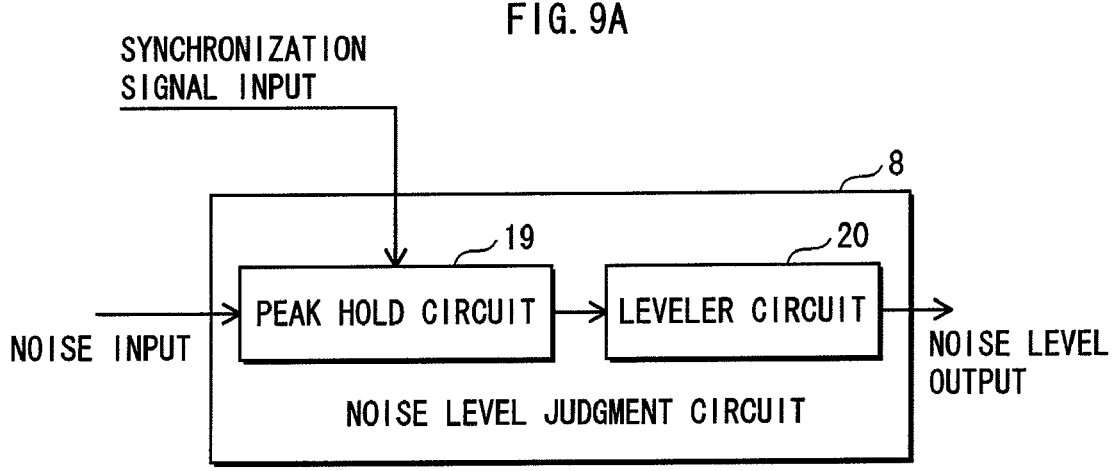
FIG. 9A shows an internal structure of a noise level judgment circuit 8 pertaining to embodiment 1.

The following describes details of the noise level judgment circuit 8 with reference to FIG. 9A. FIG. 9A shows an internal structure of the noise level judgment circuit 8 of embodiment 1. The noise level judgment circuit 8 is constituted from a peak hold circuit 19 and a leveler circuit 20, and receives "synchronization signal input" and "noise input". "Synchronization signal input" refers to the synchronization signal output from the video demodulation circuit 4. "Noise input" refers to the noise signal output from the noise detection circuit 5. The noise level judgment circuit 8 fulfils the role of quantifying a noise characteristic, so to speak, in the original video signal into a noise level from 1 to 4.

Detail 1: Peak Hold Circuit 19

The peak hold circuit 19 holds a maximum crest value in the noise input of the one frame period indicated by the synchronization signal input, and outputs the held minimum value to the leveler circuit 20.

Detail 2: Leveler Circuit 20

The leveler circuit 20 specifies the noise level as one of four noise levels from level 1 (a minimum amount of noise) to level 4 (a maximum amount of noise) according to the output of the peak hold circuit 19, and outputs a signal indicating the noise level. Since, as described above, the output of the noise detection circuit 5 is limited to +5, the noise levels are set as follows. The leveler circuit 20 specifies the noise level as level 1 if the output of the peak hold circuit 19 is ±2 or less, level 2 if the output is ±3, level 3 if the output is +4, and level 4 if the output is ±5. As shown in FIG. 1, the noise level output obtained in this way is input to the pseudo-noise generation circuit 9.

This concludes the description of the details of the noise level judgment circuit 8.

Details of the Pseudo-Noise Generation Circuit 9

Figure 9B:
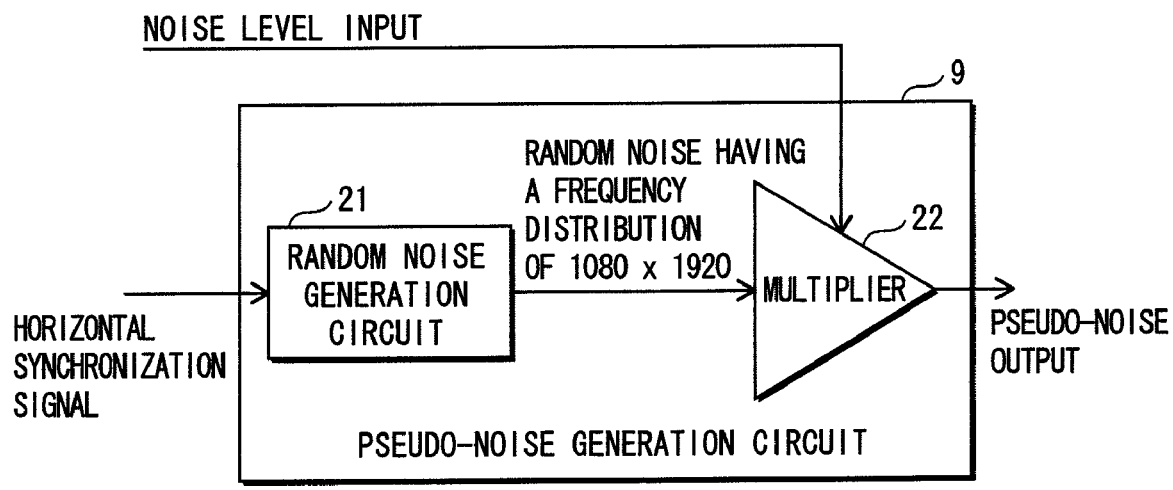
FIG. 9B shows an internal structure pertaining to a pseudo-noise generation circuit 9 pertaining to embodiment 1.

The following describes the pseudo-noise generation circuit 9 with reference to FIG. 9B. FIG. 9B shows an internal structure of the pseudo-noise generation circuit 9 pertaining to embodiment 1. The pseudo-noise generation circuit 9 fulfils the role of generating pseudo-noise that approximates the characteristic of the noise included in the original video signal.

Detail 1: Random Noise Generation Circuit 21

The random noise generation circuit 21 generates a random noise signal having a frequency distribution of 1080 vertical lines and 1920 horizontal pixels, which is equivalent to the resolution of the output from the up-converter 7. The random generation pattern of the random noise signal changes according to each specified line number.

The pattern changes are performed by synchronizing to the vertical synchronization signal input.

Detail 2: Multiplier 22

The multiplier 22 multiplies crest values of pseudo-noise in the random noise signal generated by the random noise generation circuit 21 by a factor determined according to the noise level input, and outputs the product.

When the noise level input to the noise level judgment circuit 8 is 1, the factor is 1, when the noise level is 2 the factor is 2, when the noise level is 3, the factor is 3, and when the noise level is 4, the factor is 4. This enables the crest values of generated pseudo-noise to depend on the noise level of the original video signal.

Figure 10:
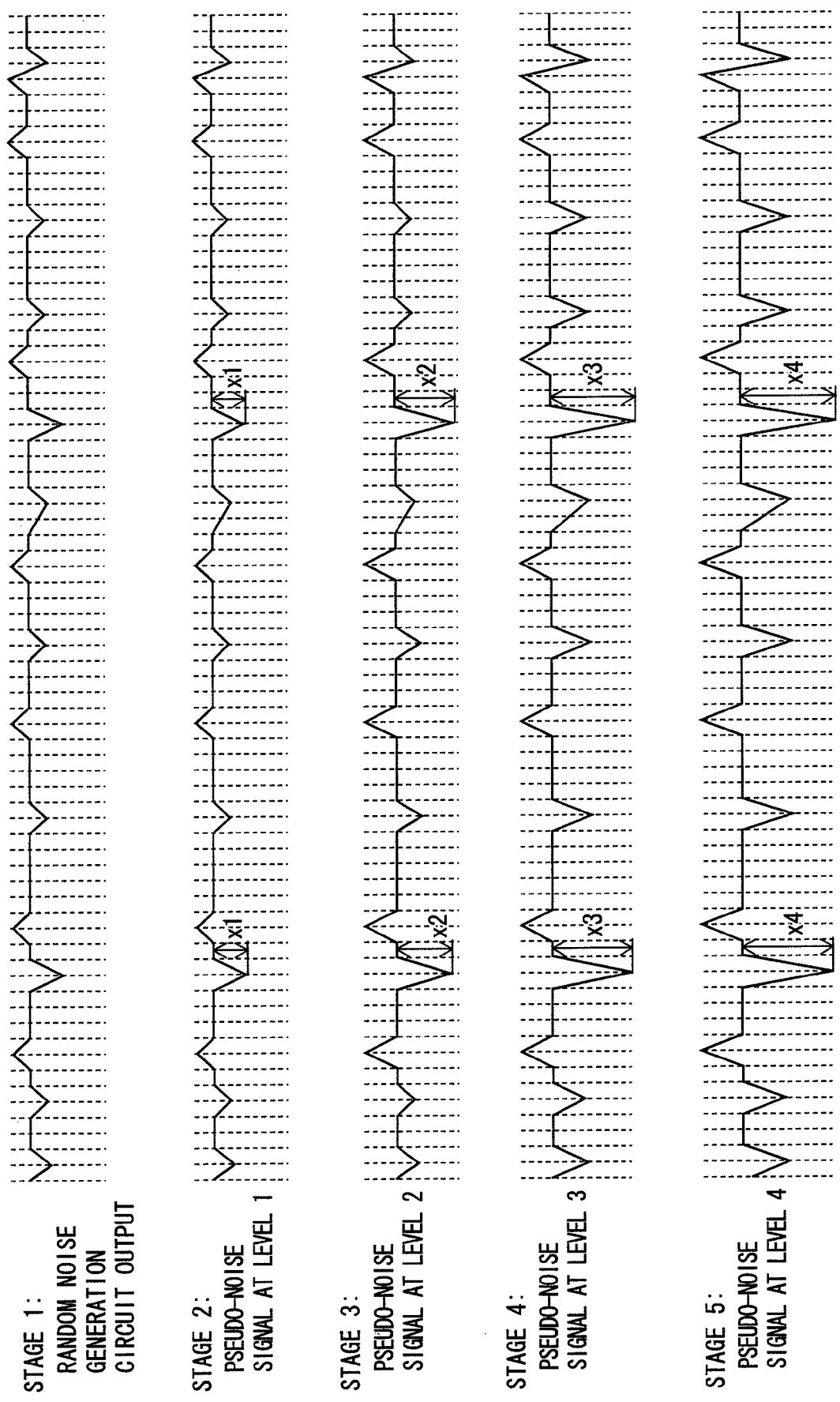
FIG. 10 shows a pseudo-noise signal generated by a multiplier 22.

FIG. 10 shows a pseudo-noise signal generated by the multiplier 22. Stage 1 of FIG. 10 shows the pseudo-noise signal generated by the random noise generation circuit 21, and Stage 2 shows a pseudo-noise signal output from the pseudo-noise generation circuit 9 at noise level 1. Here, at noise level 1, the factor by which the crest value is multiplied is "1", and therefore the output signal in Stage 2 is the same as the pseudo-noise signal input from the random noise generation circuit 21.

Stage 3 shows a pseudo-noise signal output from the pseudo-noise generation circuit 9 at noise level 2. Here, at noise level 2, the factor by which the crest value is multiplied is "2". A comparison of Stage 1 and Stage 3 shows that the crest values of the peak portions in the pseudo-noise signal of Stage 3 are twice those of Stage 1.

Stage 4 shows a pseudo-noise signal output from the pseudo-noise generation circuit 9 at noise level 3. Here, at noise level 3, the factor by which the crest value is multiplied is "3". A comparison of Stage 1 and Stage 4 shows that the crest values of the peak portions in the pseudo-noise signal of Stage 4 are three times those of Stage 1.

Stage 5 shows a pseudo-noise signal output from the pseudo-noise generation circuit 9 at noise level 4. Here, at noise level 4, the factor by which the crest value is multiplied is "4". A comparison of Stage 1 and Stage 5 shows that the crest values of the peak portions in the pseudo-noise signal of Stage 5 are four times those of Stage 1. This is true whether the peak value occurs in a positive or a negative direction.

Since, as described earlier, there is a one-frame delay in the up-converter 7 between input and output, the crest value of the noise included in the video signal is held for a period of one frame by the peak hold circuit 19 in the noise level judgment circuit 8, and the level thereof is judged by the noise level judgment circuit 8. Since the pseudo-noise generation circuit 9 outputs a pseudo-noise signal having a crest value according to the noise level, when this pseudo-noise signal is added to the output of the up-converter 7 by the adder 10, the resulting video signal has the same resolution distribution as the image after conversion, and furthermore includes noise having the same crest values as the crest values of the noise in the original video signal.

Video Signal Composited with the Pseudo-Noise Signal

The following describes the video signal sent out to the monitor by the playback apparatus described above, with reference to FIG. 11.

Figure 11:
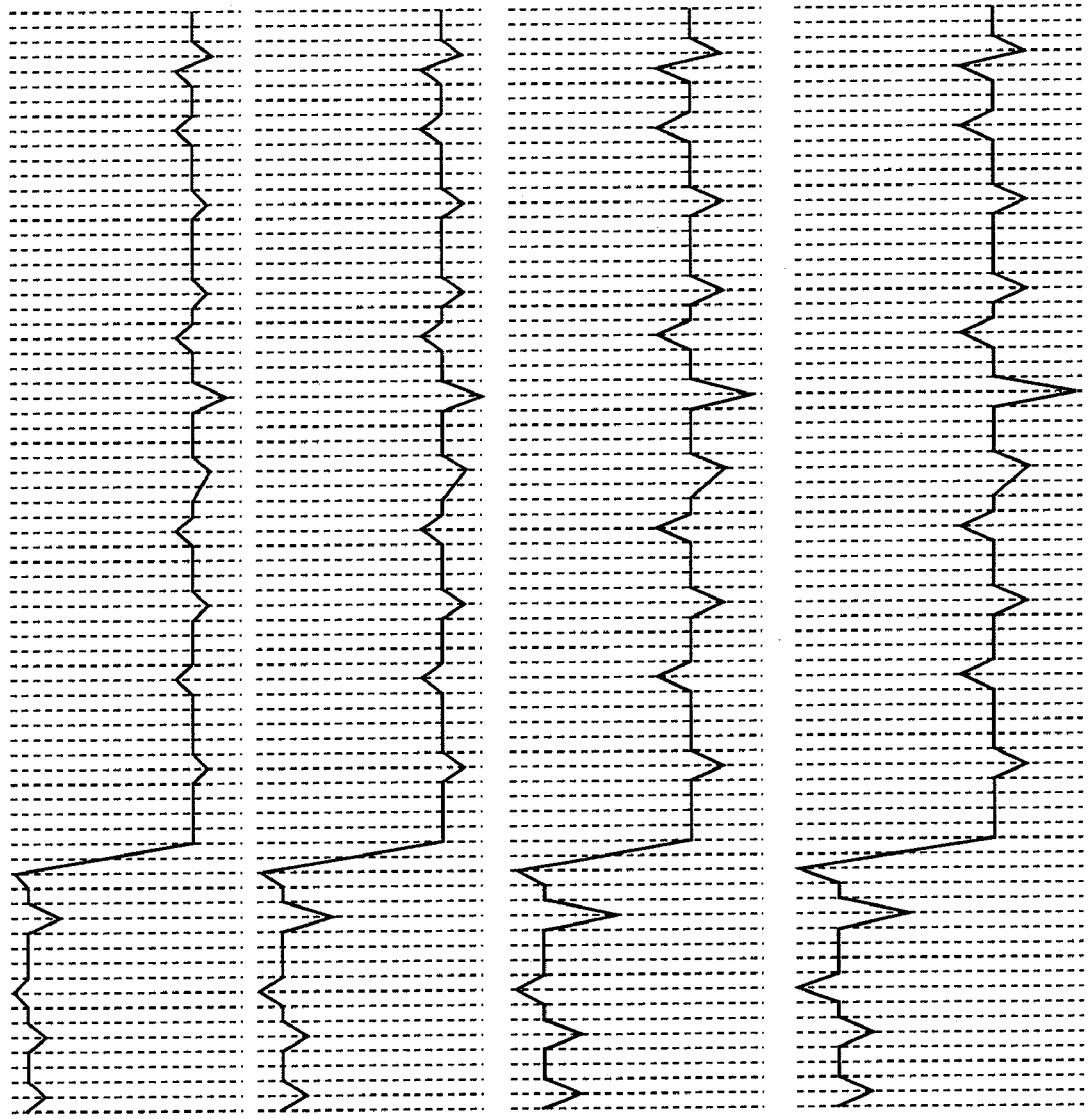
FIG. 11 shows a video signal to which a pseudo-noise signal has been added by an adder 10.

FIG. 11 shows a video signal to which a pseudo-noise signal has been added by the adder 10. Stage 1 of FIG. 1 shows a video signal to which a pseudo-noise signal at noise level 1 has been added, and Stage 2 shows a video signal to which a pseudo-noise signal at noise level 2 has been added. Stage 3 shows a video signal to which a pseudo-noise signal at noise level 3 has been added, and Stage 4 shows a video signal to which a pseudo-noise signal at noise level 4 has been added.

The pseudo-noise signals at noise level 1, noise level 2, noise level 3, and noise level 4 are the same as shown in the previous drawing. Since the noise level increases as the stages progress in the present drawing, a higher noise level indicates noise having higher crest values appearing in the video signal.

SUMMARY

The following describes changes in the content of an SD image containing noise when up-conversion is performed, and when noise is removed from the SD image and a pseudo-noise signal is added.

FIG. 12A shows how an SD image containing noise changes when up-conversion is performed. The left side of FIG. 12A shows the SD image before the up-conversion, and the right side shows the HD image after the up-conversion. Film grains that are expressed on the left side by one pixel are expressed on the right side by a plurality of pixels, 2 vertical pixels by 2 horizontal pixels.

FIG. 12B shows the SD image of FIG. 12A before the up-conversion and an exemplary HD image after up-conversion when displayed on a television of the same size. The left side of the present drawing shows the SD image, and the right side shows the HD image. Since the film grains that are expressed on the left side by one pixel are expressed on the right side by a plurality of pixels, 2 vertical pixels by 2 horizontal pixels, the size of the film grain in proportion to the image as a whole does not change, and the user does not have a tangible sense that the image became high-definition as a result of the up-conversion.

FIG. 13A shows how the SD image changes when noise has been removed and a pseudo-noise signal has been added. The left side of the present drawing shows the SD image before up-conversion, and the right side shows the HD image after up-conversion. Since the film grains that are expressed on the left side by one pixel have been removed, and instead a pseudo-noise signal has been added in accordance with a level of the film grain, the HD image on the right side shows that one pixel of pseudo-noise has been randomly distributed.

FIG. 13B shows the SD image before the up-conversion of FIG. 13A and an exemplary display of an HD image after up-conversion when displayed on a television of the same size. The left side of the present drawing is the SD image, and the right side is the HD image. Since the film grains that are represented on the left side as one pixel is represented instead on the right side as a scattering of one-pixel noise, a size ratio of the film grain to the image as a whole is smaller, thus giving the user a tangible sense that the image became high-definition as a result of the up-conversion.

According to the present embodiment described above, simplification of circuit size is achieved, since noise having a high-definition frequency distribution is added to the output of the up-converter that converts a video signal to high-definition. Also, adding noise having a high-definition frequency distribution has the benefit of increasing the high-definition feel of the up-converted video signal.

Embodiment 2

Figure 14:
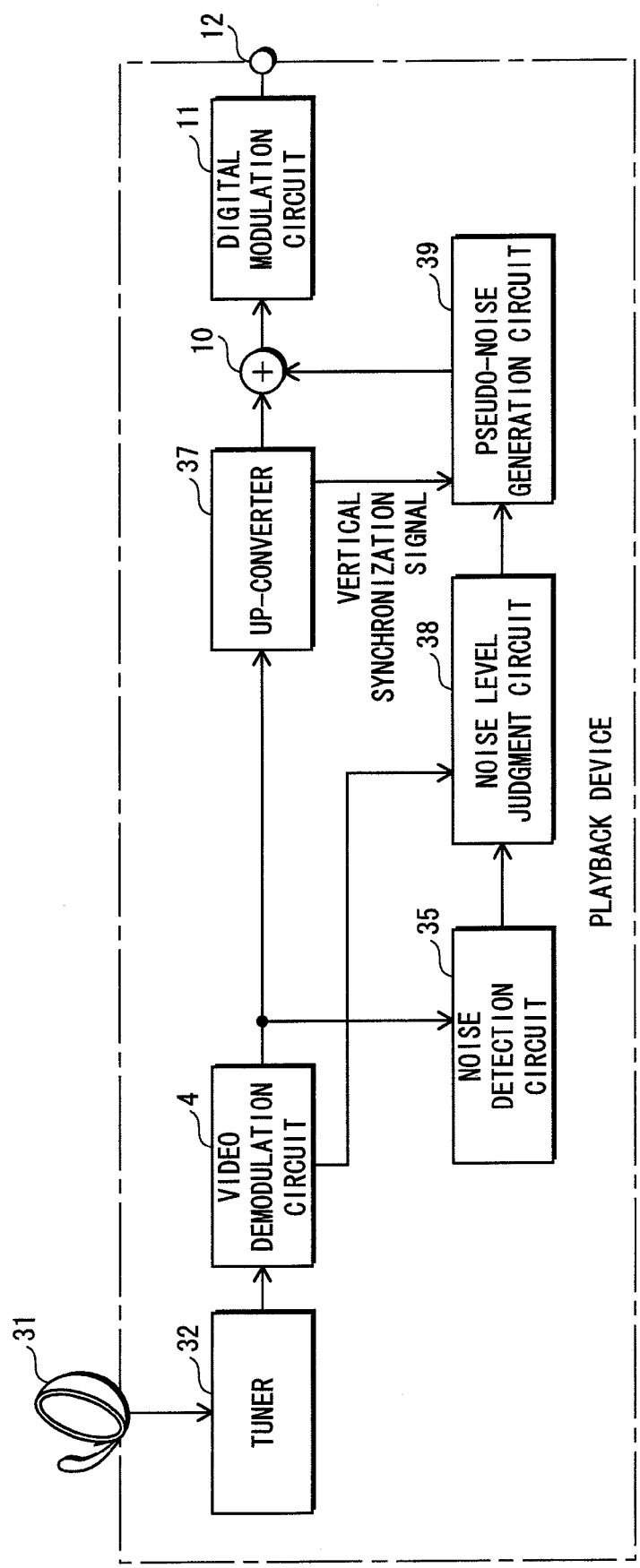
FIG. 14 shows an internal structure of a playback apparatus pertaining to embodiment 2.
Figure 15:
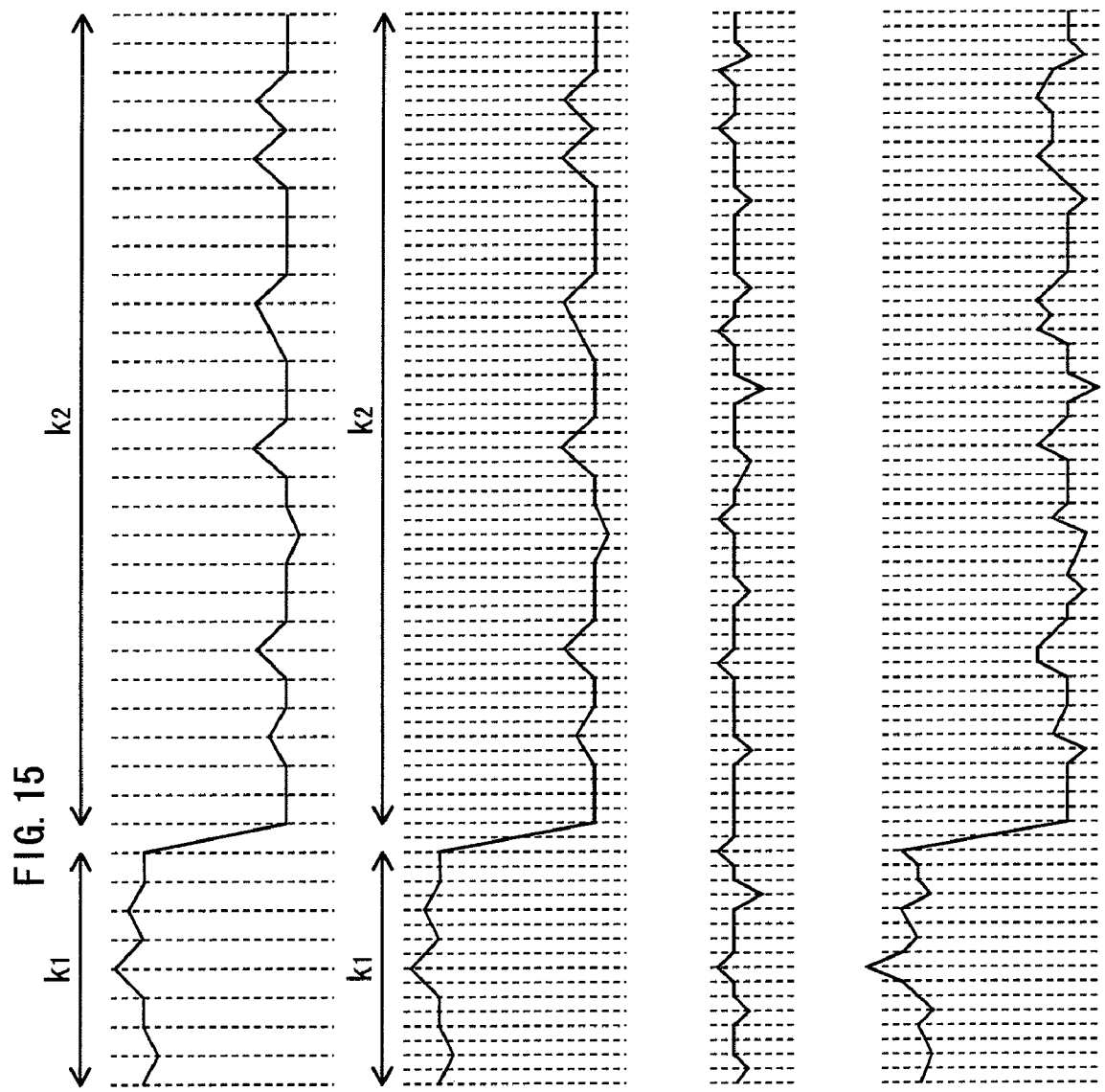
FIG. 15 is a timing chart showing changes in video signals that are output from constituent elements of the playback apparatus of embodiment 2.

Although embodiment 1 described a case in which the optical disk 1 is the input source of the video signal, the present embodiment is an improvement for a case in which the input source of the video signal is a broadcast wave. FIG. 14 shows an internal structure of a playback apparatus when the input source of the video signal is a transmission medium. A comparison with the internal structure in FIG. 1 shows that in FIG. 14, the optical disk 1, the optical pickup unit 2, and the motor 3 have been replaced by an antenna 31 and a tuner 32. Although the video demodulation circuit 4 is the same as embodiment 1, the noise detection circuit 5, the noise removal circuit 6, the up-converter 7, the noise level judgment circuit 8, and the pseudo-noise generation circuit 9 have been replaced by a noise detection circuit 35, an up-converter 37, a noise level judgment circuit 38, and a pseudo-noise generation circuit 39. FIG. 15 is a timing chart showing how a video signal changes when output from constituent elements of the playback apparatus of embodiment 2.

1. Reception Antenna 31

The reception antenna 31 receives a broadcast and converts the broadcast into an electronic signal. The video signal received by the antenna 31 has been compressed according to the MPEG-2 system (ITU-T Recommendation H.262/ISO/IEC13818-2).

2. Tuner 32

The tuner 32 selects a desired broadcast from the output of the reception antenna. In FIG. 14, a signal recorded in the broadcast received by the antenna 31 is selected by the tuner 32, demodulated by the video demodulation circuit 4, and is output as a video signal along with a synchronization signal necessary for playback. The original video signal that was demodulated in this way is input to the noise detection circuit 35 and the up-converter 37.

3. Noise Detection Circuit 35

The noise detection circuit 35 detects small-amplitude signal components that are noise, based on the difference between the original video signal and a signal that has a one-frame delay from the original video signal.

4. Up-Converter 37

The up-converter 37 receives an input of the video signal that has been output from the video demodulation circuit 4, and performs up-conversion on the input video signal. At the same time, the up-converter 37 outputs a vertical synchronization signal of the output video to the pseudo-noise generation circuit 39. Stage 1 of FIG. 15 shows the video signal before up-conversion, and Stage 2 shows the video signal after up-conversion. Stage 2, when compared to Stage 1, has a denser grid spacing. This indicates that the image that is up-converted by the up-converter 7 is expressed by a larger number of pixels. Also, in Stage 2, there is noise in each of the periods k1 and k2. This means that up-conversion was performed without having removed the noise.

5. Noise Level Judgment Circuit 38

The noise level judgment circuit 38 receives an input of an output signal from the noise detection circuit 35, and outputs one of four signal levels indicating noise levels, according to the amount of noise.

6. Pseudo-Noise Generation Circuit 39

The pseudo-noise generation circuit 39 generates noise having the same resolution as the output from the up-converter 37. The pseudo-noise generation circuit 39 has a structure such that a rate of pseudo-noise that is generated depends on the noise level of the original video signal. Therefore, the amount of pseudo-noise added depends on an amount of the small-amplitude signal component that is noise included in the original video signal.

Stages 3 and 4 of FIG. 15 show a contrast between a pseudo-noise signal and a video signal to which the pseudo-noise signal has been added. Stage 4 is represented on the same grid as Stage 3. Note that depiction of the pseudo-noise that exists in the original video has been omitted in Stage 4 of FIG. 15 for simplicity. The output of the up-converter 37 has a resolution of 720 vertical lines and 1280 horizontal pixels, and the output signal of the noise generation circuit 39 also has the same resolution distribution. Accordingly, as shown in Stage 4 of FIG. 15, a small-amplitude signal component (which is noise) having a higher frequency component than the frequency component of the up-converted original video signal is included in the video signal to which the pseudo-noise signal has been added by the adder 10.

This completes the description of the playback apparatus of embodiment 2. The following describes details of the noise detection circuit 35 of embodiment 2 with reference to FIG. 16.

Details of the Noise Detection Circuit 35

Figure 16:
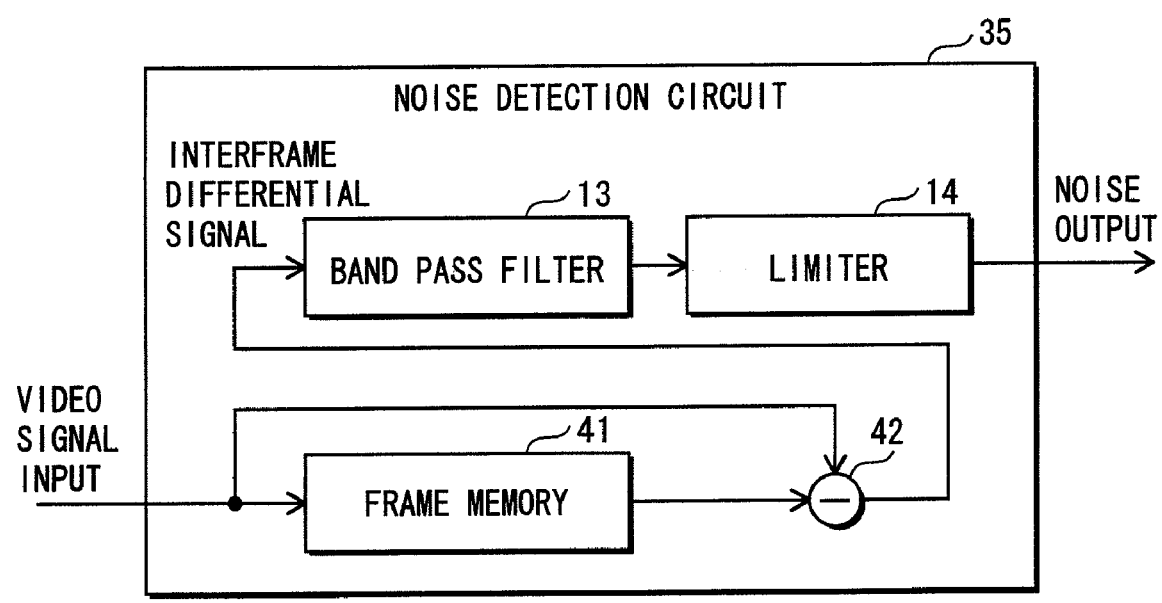
FIG. 16 shows an internal structure of a noise detection circuit 35 pertaining to embodiment 2 of the present invention.

FIG. 16 shows an internal structure of the noise detection circuit 35 pertaining to embodiment 2 of the present invention. A "video signal input" in FIG. 16 is a video signal that has been demodulated by the video demodulation circuit 4. The band pass filter 13 and the limiter 14 in FIG. 16 are the same as in embodiment 1. In the noise detection circuit 35 of FIG. 16, a frame memory 41 and a subtracter 42 exist upstream of the band pass filter 13, and the band pass filter 13 receives an input of the output from the subtracter 42.

Rather than removing a specified frequency area from frames as indicated in embodiment 1, a characteristic of the noise detection circuit 35 is removal of the specified frequency area from an interframe differential signal.

Detail 1: Frame Memory 41

The frame memory 41 accumulates and outputs one frame of an input signal at a time.

Detail 2: Subtracter 42

The subtracter 42 obtains a difference between the video signal input and frame memory 41 output. Accordingly, the video signal input to the band pass filter 13 is the difference between the original video signal and a signal having a delay of one frame. In this way, the difference between the video signal and the video signal that is one frame previous is targeted by the band pass filter 13 for extraction of the specified frequency component.

The limiter 14 only extracts the small-amplitude signal component from the original video signal, and the output signal of the noise extraction circuit 35 obtained in this way is input to the noise level judgment circuit 38.

This concludes the description of the noise detection circuit 35. The following describes details of the up-converter 37 with reference to FIG. 17.

Details of the Up-Converter 37

Figure 17:
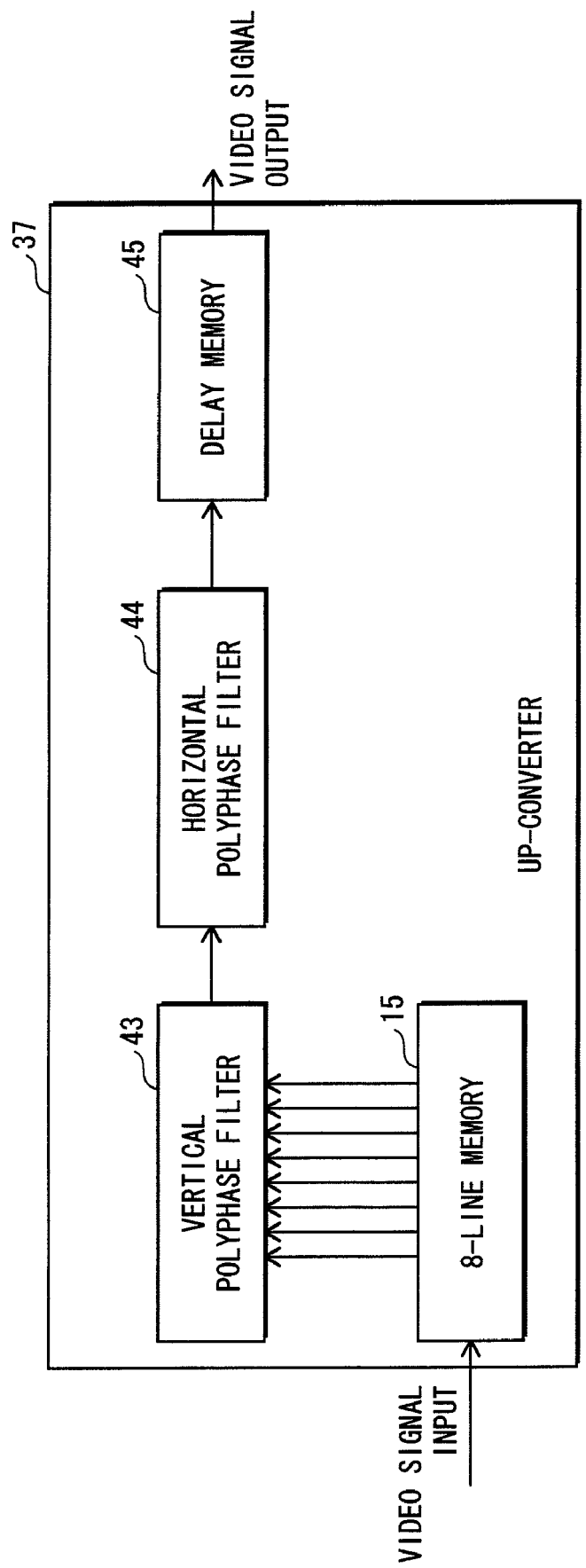
FIG. 17 shows an internal structure of an up-converter 37 of the playback apparatus pertaining to embodiment 2 of the present invention.

FIG. 17 shows an internal structure of the up-converter 37 of the playback apparatus pertaining to embodiment 2 of the present invention. The 8-line memory 15 in FIG. 17 is the same as in embodiment 1. In the present embodiment, a vertical polyphase filter 43, a horizontal polyphase filter 44, and a delay memory 45, which are constituent elements particular to embodiment 2, exist downstream of the 8-line memory.

Detail 1: Vertical Polyphase Filter 43

Figure 18A:
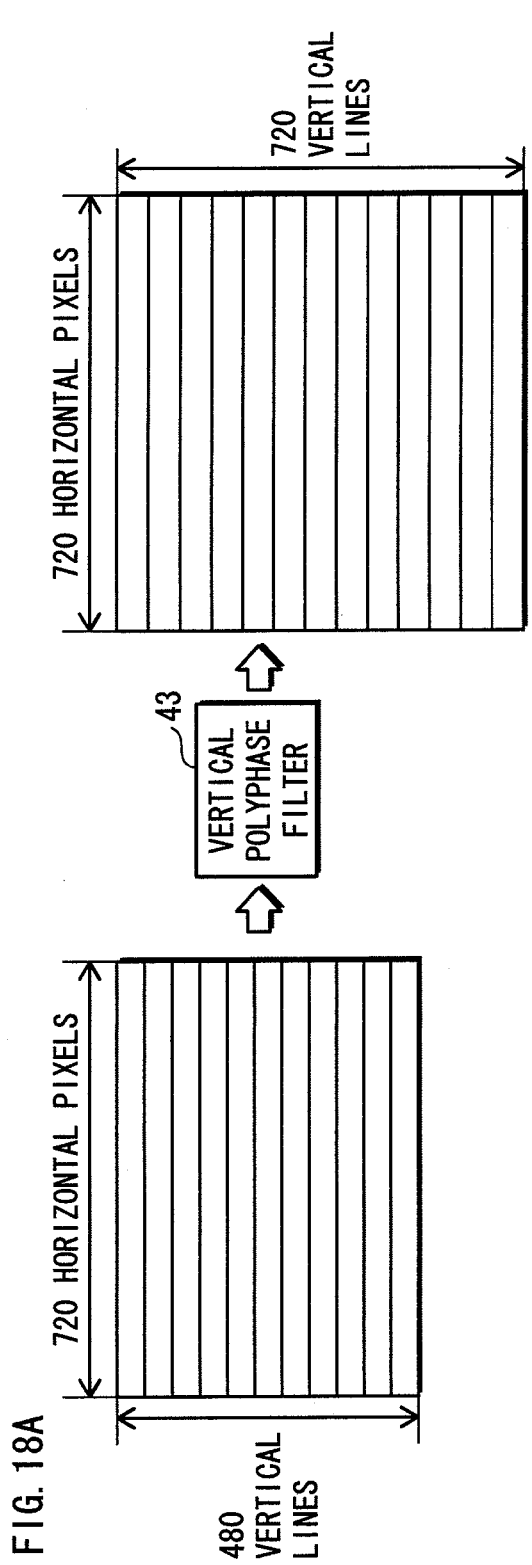
FIG. 18A shows a frame image before and after conversion by a vertical polyphase converter 43.

Eight video signals from the eight-line memory 15 are input to the vertical polyphase filter 43, the eight video signals being a one-horizontal line delay video signal, a two-horizontal line delay video signal, a three-horizontal line delay video signal, a four-horizontal line delay video signal, a five-horizontal line delay video signal, a six-horizontal line delay video signal, a seven-horizontal line delay video signal, and an eight-horizontal line delay video signal. The vertical polyphase filter 43 performs vertical interpolation based on these eight video signals with use of, converts the resolution from the 480 vertical lines of the original video signal into 720 lines, and outputs to the horizontal polyphase filter 44. FIG. 18A shows a frame image before and after conversion by the vertical polyphase filter 43. As shown in FIG. 18A, the original video signal of 480 vertical lines and 720 horizontal pixels is converted into a high-definition video signal of 720 vertical lines and 720 horizontal pixels.

Detail 2: Horizontal Polyphase Filter 44

Figure 18B:
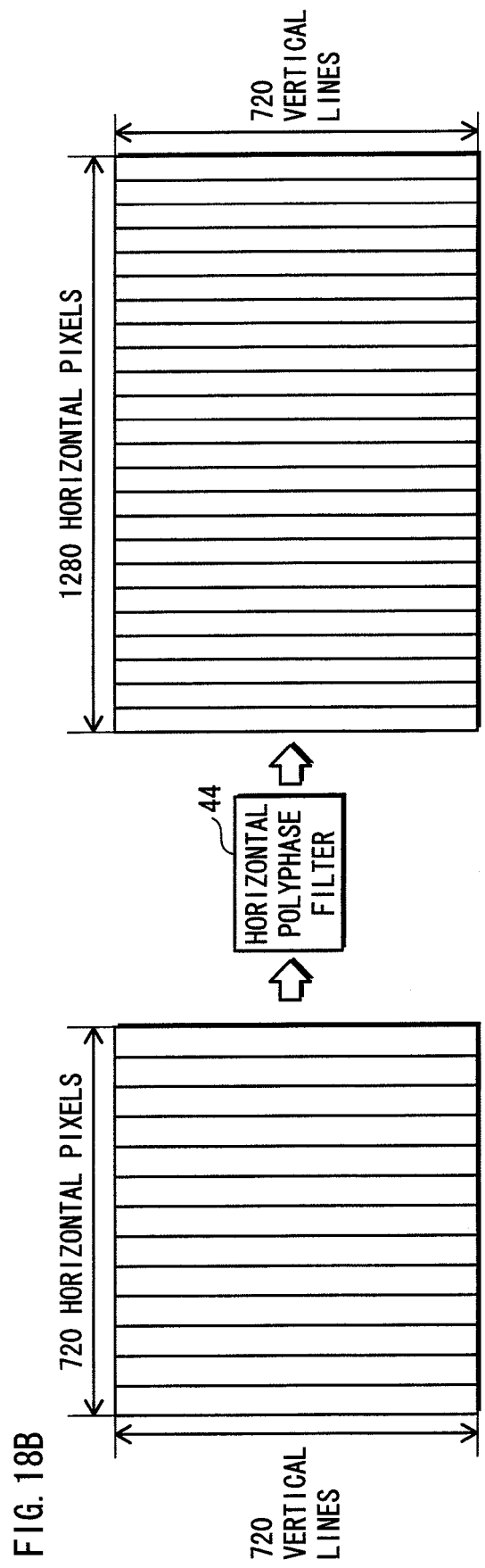
FIG. 18B shows a frame image before and after conversion by a horizontal polyphase filter 44.

The horizontal polyphase filter 44 includes an 8-tap polyphase filter, performs horizontal interpolation, converts the 720 vertical pixels of resolution of the original video signal into 1280 horizontal pixels, and inputs the converted video signal to the delay memory 45. FIG. 18B shows a frame image before and after conversion by the horizontal polyphase filter 17. As shown in FIG. 18B, the original video signal of 720 vertical lines and 720 horizontal pixels is converted into a high-definition video signal of 720 vertical lines and 1280 horizontal pixels.

Detail 3: Delay Memory 45

The delay memory 45 provides a delay of a predetermined time to the output from the horizontal polyphase filter 44. In regards to this delay, there is precisely one frame of delay from the input to the output in FIG. 17. This concludes the description of the up-converter 37. The following describes details of the noise level judgment circuit 38 with reference to FIG. 19.

Details of the Noise Level Judgment Circuit 38

Figure 19:
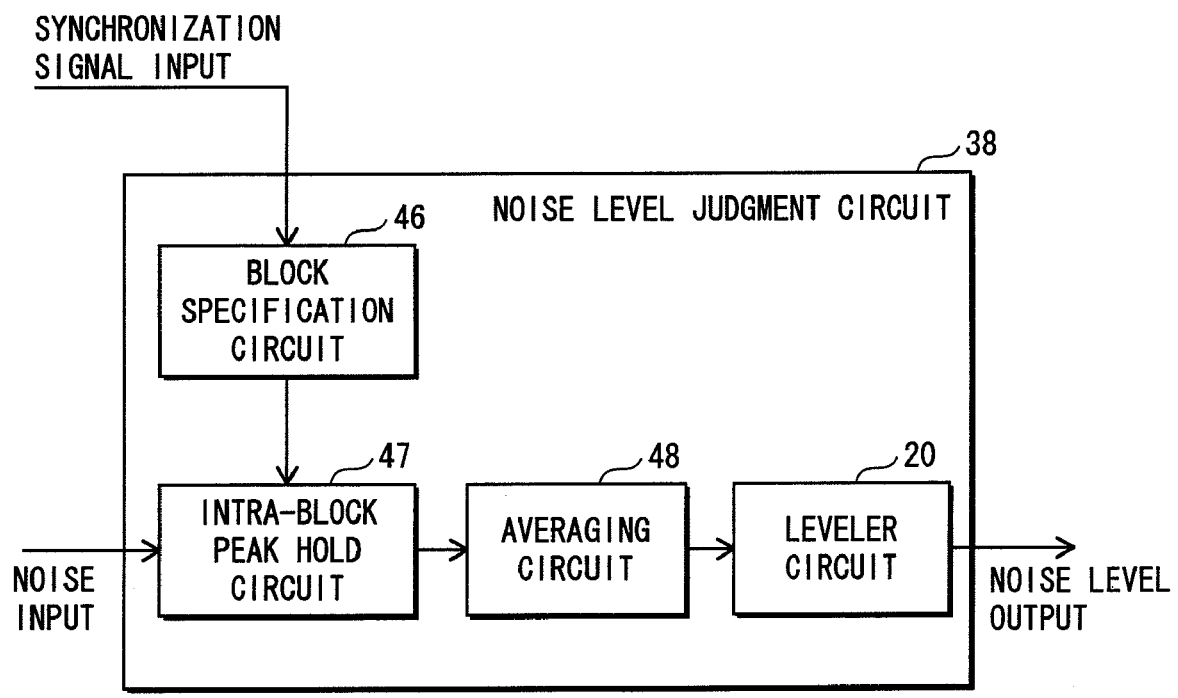
FIG. 19 shows an internal structure of a noise level judgment circuit 38.

FIG. 19 shows an internal structure of the noise level judgment circuit. In FIG. 19, "synchronization signal input" refers to a synchronization signal from the video demodulation circuit 4, and "noise input" refers to the noise signal output from the noise detection circuit 35. In FIG. 19, the leveler circuit 20 is the same as in embodiment 1. In the present embodiment, a block specification circuit 46, an inter-block peak hold circuit 47, and an averaging circuit 48, which are constituent elements particular to embodiment 2, exist upstream of the leveler circuit 20.

Detail 1: Block Specification Circuit 46

Figures 20A, 20B:
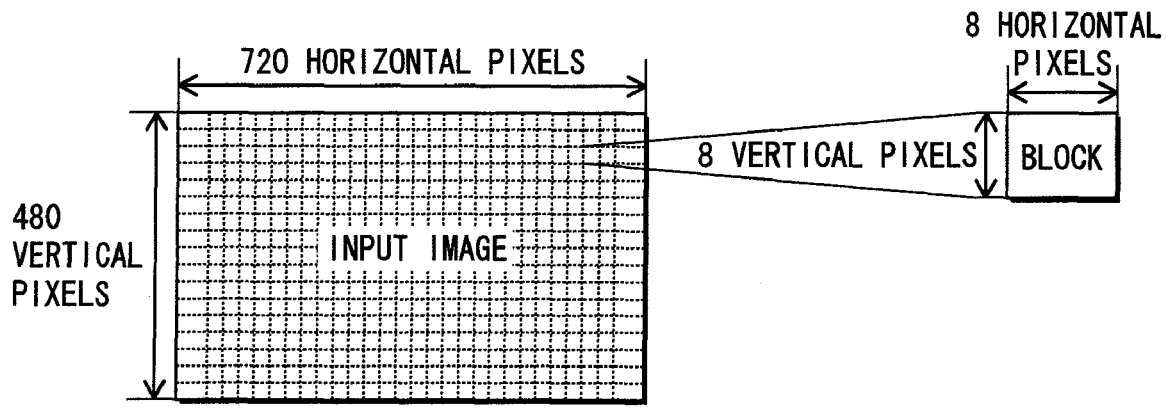
FIG. 20A shows a pixel block in an input image.
FIG. 20B shows crest values held in an intra-block peak hold circuit 47.

The block specification circuit 46 expresses positions in an input noise signal with use of block coordinates. FIG. 20A shows blocks in a frame. Here, a "block" is a grouping of 8×8 pixels in a frame specified by a synchronization signal input, and the block coordinates are expressed as coordinates (x,y) in a coordinate system whose origin is the upper leftmost point of the image.

Detail 2: Intra-Block Peak Hold Circuit 47

The intra-block peak hold circuit 47 holds maximum values (noise peak values) of crest values of noise input in the blocks indicated by the block specification circuit, and outputs the noise peak values to the averaging circuit 48. FIG. 20B shows the noise peak values that are held in the intra-block peak hold circuit 47.

FIG. 20B depicts blocks from coordinates (1,1) to (3,1), (1,2) to (3,2), (1,3) to (3,3), and (1,4) to (3,4). When such blocks exist in the differential signal, the intra-block peak hold circuit 47 holds, and provides to the averaging circuit 48, the peak values of the crest values in the blocks. In the present embodiment, since the peak values of each block that constitutes the difference are held, and an average peak value is calculated for one entire frame, even if a pixel value of one entire picture cannot be obtained, a characteristic of the original image can be obtained from the difference.

Detail 3: Averaging Circuit 48

The averaging circuit 48 calculates an average value within one frame of a plurality of peak values that are held in the intra-block peak hold circuit 47 and outputs the average value. When the average value is output in this way, the leveler circuit 20 specifies the output of the averaging circuit 48 as one of four levels from level 1 (a minimum amount of noise) to level 4 (a maximum amount of noise), and outputs a signal indicating the level. Since, as described above, the output of the noise detection circuit 35 has been limited to +5, the noise levels are set as follows. The leveler circuit 20 specifies the noise level as level 1 if the output of the averaging circuit 48 is ±2 or less, level 2 if the output is ±3, level 3 if the output is +4, and level 4 if the output is ±5. Accordingly, the noise level is a value corresponding to the average value of one frame of a measured value of the noise amount in the blocks.

As described above, the intra-block peak hold circuit 47 divides one frame of the video signal into blocks of 8 vertical lines and 8 horizontal pixels, and obtains a peak value for each of the blocks. The averaging circuit 48 obtains an average value of the peak values in the frame.

As a result, the noise level is obtained by the leveler circuit 20.

This concludes the description of the noise level judgment circuit 38. The following describes the details of the pseudo-noise generation circuit 39 with reference to FIG. 21.

Details of Pseudo-Noise Generation Circuit 39

Figure 21:
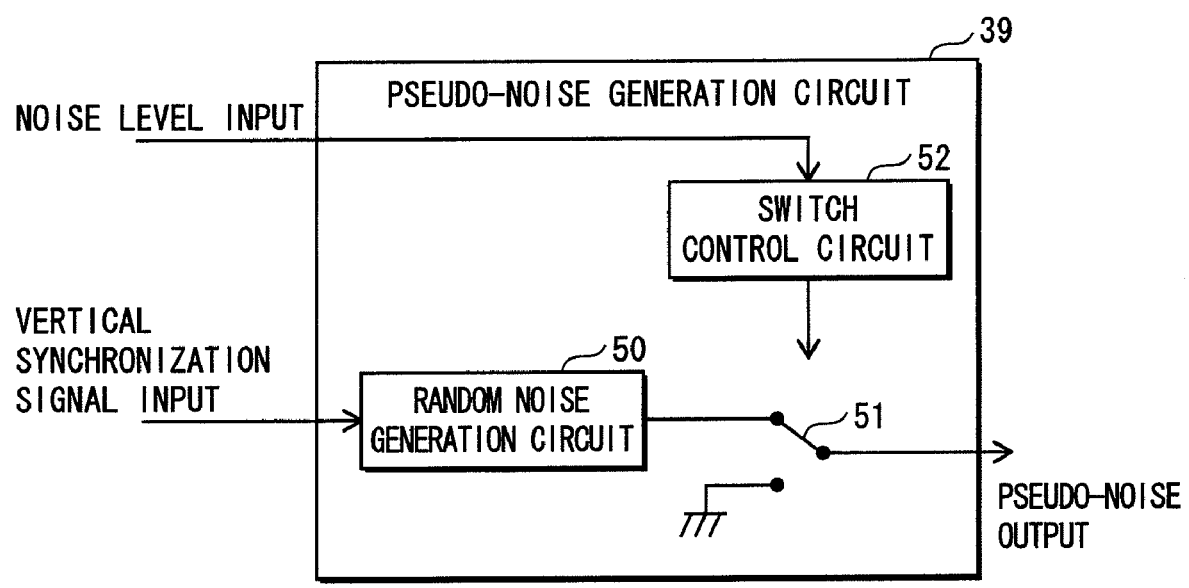
FIG. 21 shows an internal structure of a pseudo-noise generation circuit 39 pertaining to embodiment 2.

FIG. 21 shows an internal structure of the pseudo-noise generation circuit 39 pertaining to embodiment 2. In FIG. 21, "noise level input" refers to the signal indicating the noise level output from the noise level judgment circuit 38. The pseudo-noise generation circuit 39 in FIG. 21 is constituted from a random noise generation circuit 50, a switch 51, and a switch control circuit 52.

Detail 1: Random Noise Generation Circuit 50

The random noise generation circuit 50 generates random noise having the same frequency distribution of 720 vertical lines and 1280 horizontal pixels as the output of the up-converter 37. The generation pattern of the random noise changes randomly once every specified number of frames in synchronization with the vertical synchronization signal input.

Detail 2: Switch 51

The switch 51 switches between outputting the output of the random noise generation circuit 50 and outputting no signal.

Detail 3: Switch Control Circuit 52

In accordance with a noise level, the switch control circuit 52 switches a rate at which the switch selects between the output of the random noise generation circuit 50 and no signal. Specifically, at noise level 1, the rate of selecting the output of the random noise generation circuit 50 to selecting no signal is set at 1:3. At noise level 2, the rate of selecting the output of the random noise generation circuit 50 to selecting no signal is set at 1:2. At noise level 3, the rate of selecting the output of the random noise generation circuit 50 to selecting no signal is set at 1:1. At noise level 4, the rate of selecting the output of the random noise generation circuit 50 to selecting no signal is set at 1:0. This enables the rate of pseudo-noise generated by the pseudo-noise generation circuit 39 to depend on the noise level of the original video signal. The pseudo-noise generated in this way is added by the adder 10 to the output of the up-converter 37.

Video Signal Composited with the Pseudo-Noise Signal

Figure 22:
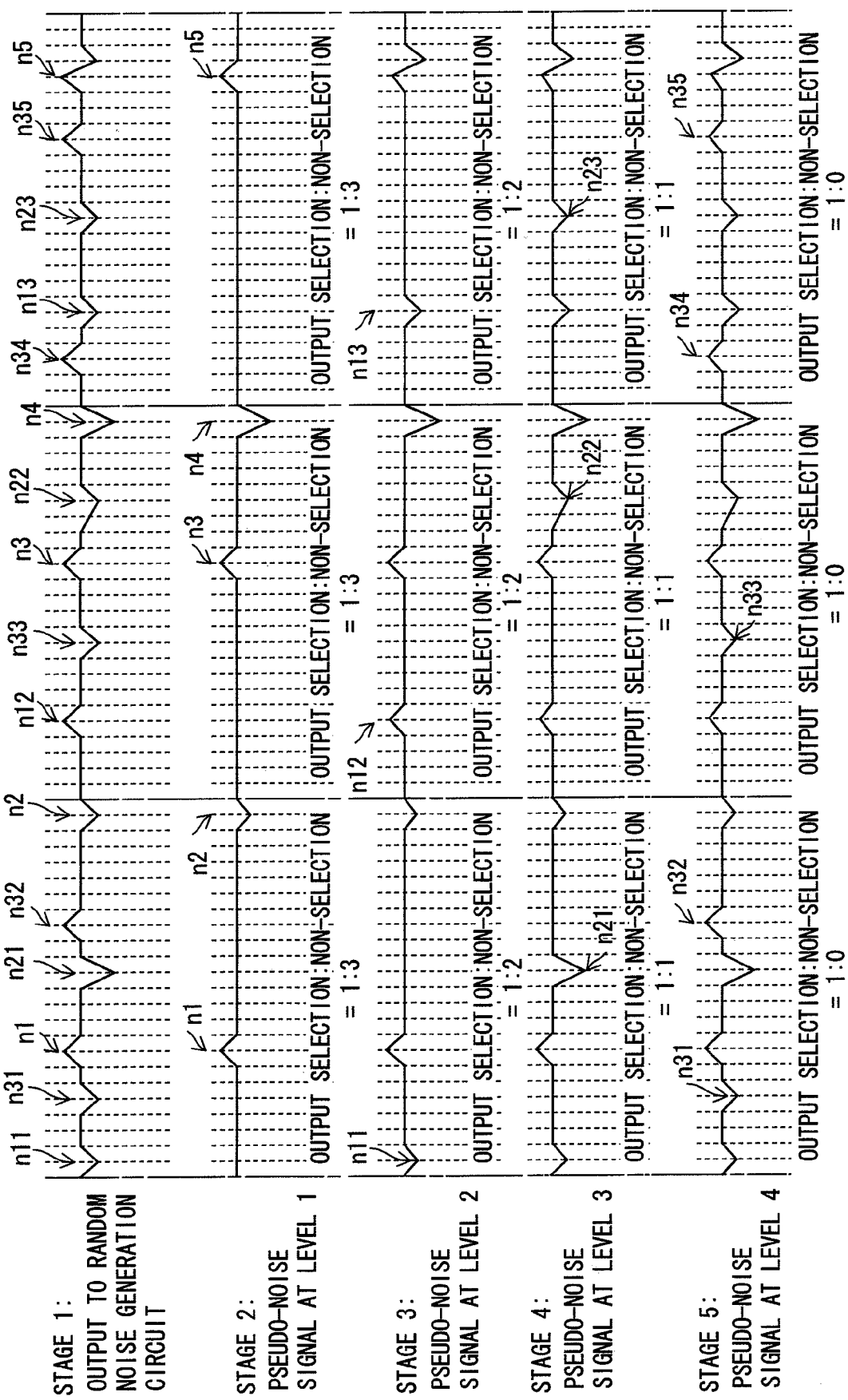
FIG. 22 shows types of pseudo-noise signals generated in accordance with settings of signal rates in a switch control circuit 52.

The following describes, with reference to FIG. 22, video signals sent by the above playback apparatus to the monitor.

FIG. 22 shows pseudo-noise signals generated in accordance with how the switch control circuit 52 sets the signal rate.

Stage 1 of FIG. 22 shows a pseudo-noise signal that is input to the random noise generation circuit 30. Stage 2 shows a pseudo-noise signal output from the random noise generation circuit 50 at noise level 1. Here, at level 1, a rate of the switch control circuit 52 selecting output of a signal to selecting not to output the signal is set at 1:3. Therefore, as shown in Stage 2, out of all noise in Stage 1, only noise n1, n2, and n3 appear in the output signal.

Stage 3 shows output of the output signal at noise level 2. At noise level 2, since the rate of the switch control circuit 52 selecting output of the signal and selecting not to output the signal is set at 1:2, as shown in Stage 3, out of all the noise in Stage 1, noise n11, n12, and n13, which do not appear in Stage 2, appear in the output signal.

Stage 4 shows output of the output signal at noise level 3. At level 3, since the rate of selecting output and selecting not to output the signal is set at 1:1, as shown in Stage 4, out of all the noise in Stage 1, noise n21, n22, and n23, which do not appear in Stage 2 and Stage 3, appear in the output signal.

Stage 5 shows output of the output signal at noise level 4. At level 4, since the rate of selecting output and selecting not to output the signal is set at 1:0, as shown in Stage 5, out of all the noise in Stage 1, noise n31, n32, and n33, not appearing in Stages 2 to 5, appear in the output signal.

Figure 23:
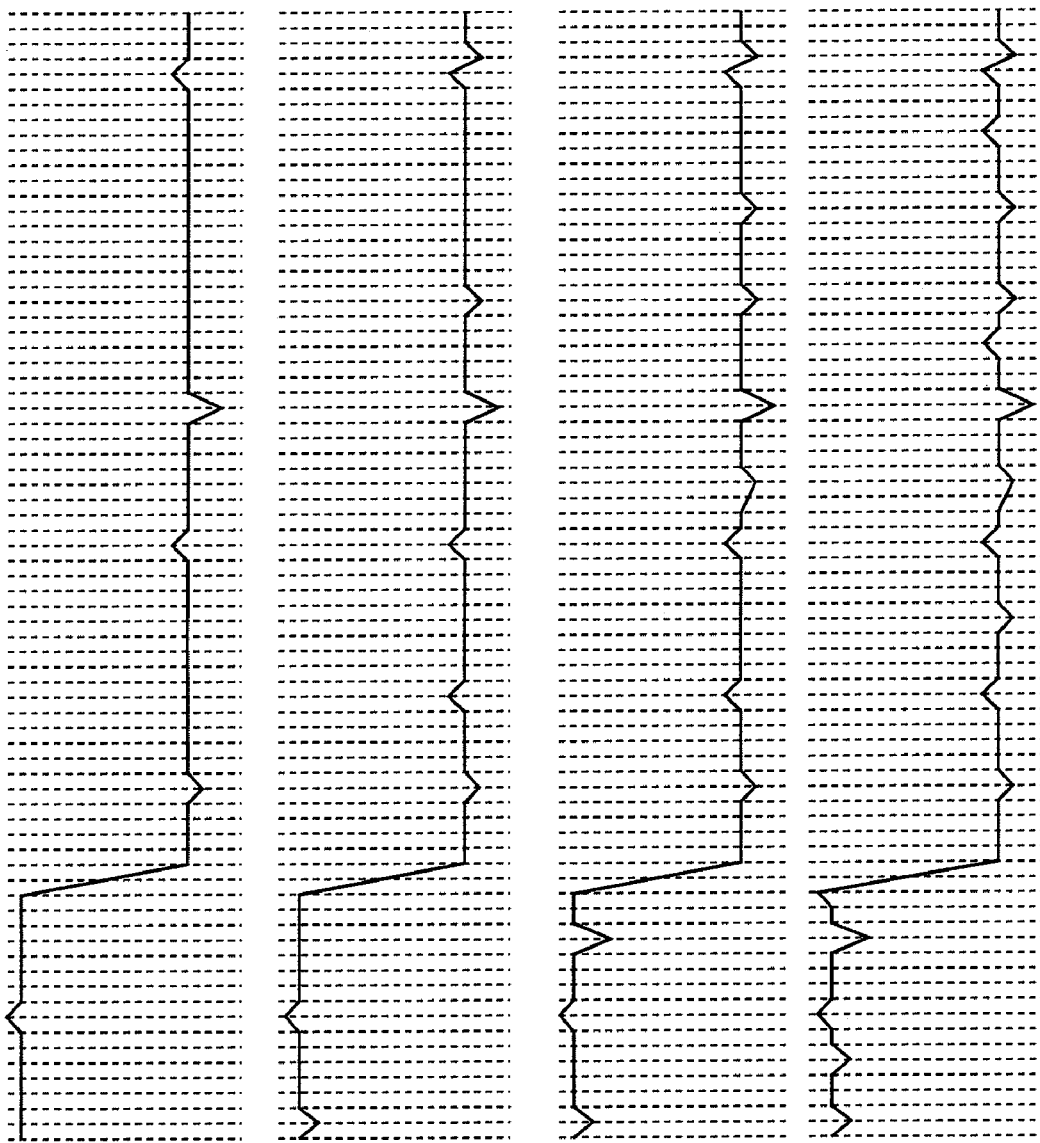
FIG. 23 shows a video signal to which a pseudo-noise signal has been added by the adder 10.

FIG. 23 shows a video signal to which a pseudo-noise signal has been added by the adder 10. Stage 1 of FIG. 23 shows a video signal to which a pseudo-noise signal at noise level 1 has been added, and Stage 2 shows a video signal to which a pseudo-noise signal of noise level 2 has been added. Stage 3 shows a video signal to which a pseudo-noise signal of noise level 3 has been added, and Stage 4 shows a video signal to which a pseudo-noise signal of noise level 4 has been added. Note that in FIG. 23, depiction of pseudo-noise that exists in the original video has been omitted for simplicity.

The pseudo-noise signals at noise level 1, noise level 2, noise level 3, and noise level 4 are the same as shown in the previous drawing. Since the noise level increases as the stages progress in FIG. 23, a higher noise level indicates more noise appearing in the video signal.

According to the present embodiment, the playback apparatus converts a video signal into a high-definition video signal, and adds pseudo-noise to the video signal in accordance with the resolution thereof, which has the benefit of enabling increasing a high-definition feel in the resolution-converted video signal.

If noise having large crest values exists in the original video signal before conversion, pseudo-noise having corresponding crest values is composited with the video signal, thereby creating the atmosphere of the film image, even if there is not an exact correspondence with the film grain in the original image. Also, it is possible to simplify the circuit structure, to the extent that the positions of the film grain are not represented, thereby contributing to a low cost.

Embodiment 3

Figure 24:
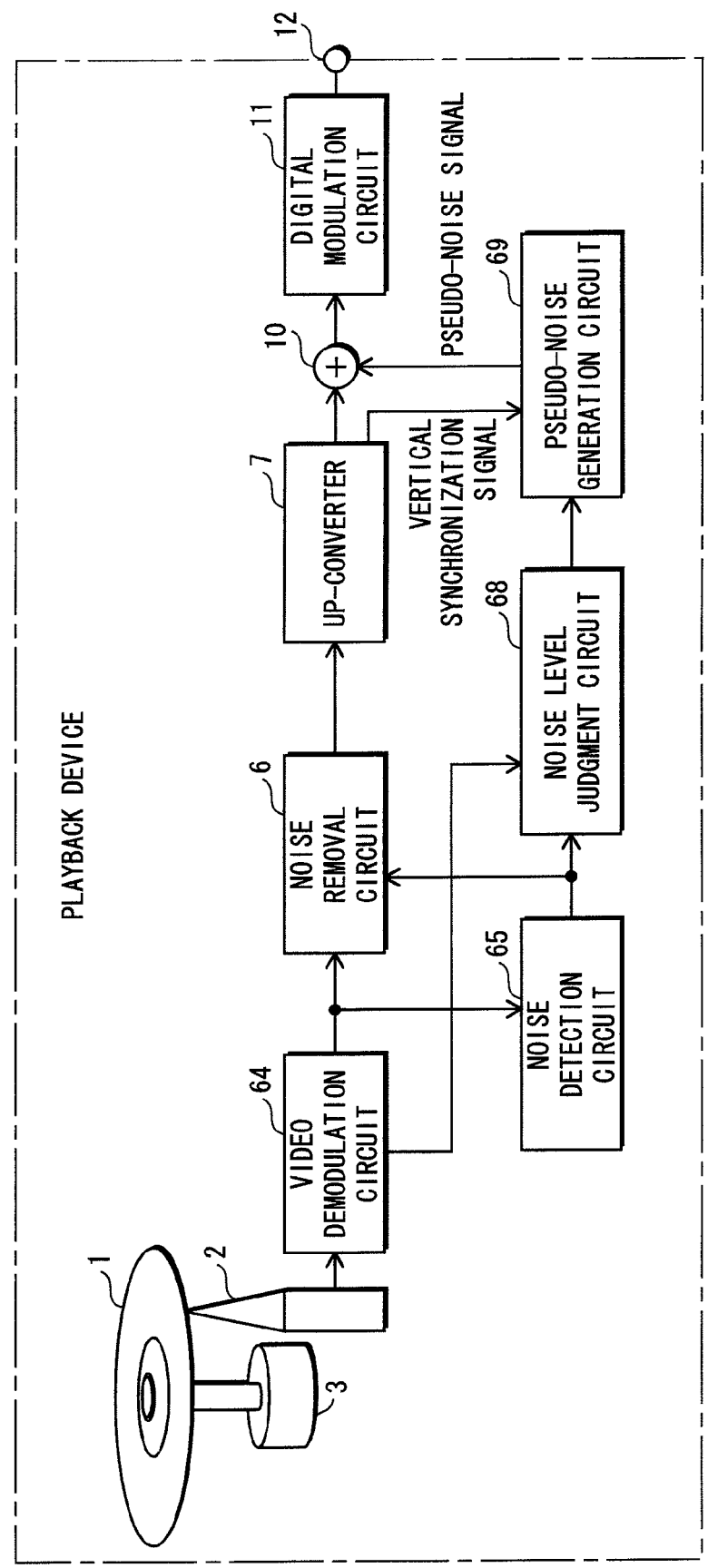
FIG. 24 shows an internal structure of a playback apparatus pertaining to embodiment 3.

The following describes an internal structure of a playback apparatus of embodiment 3. FIG. 24 shows an internal structure of the playback apparatus pertaining to embodiment 3. FIG. 24 is based on the internal structure of the playback apparatus of embodiment 1 as shown in FIG. 1. FIG. 24 differs from FIG. 1 in that the video demodulation circuit 4, the noise detection circuit 5, the noise level judgment circuit 8, and the pseudo-noise generation circuit 9 of embodiment 1 have been replaced by a video demodulation circuit 64, a noise detection circuit 65, a noise level judgment circuit 68, and a pseudo-noise generation circuit 69 in the playback apparatus of embodiment 3. The other constituent elements, namely the optical disk 1, the optical pickup unit 2, the noise removal circuit 6, the up-converter 7, the adder 10, the digital modulation circuit 11, and the terminal 12 are the same as those shown in embodiment 1. The following describes improvements in the present embodiment.

Video Demodulation Circuit 64

The video demodulation circuit 64 performs error correction and the like on the output of the optical pick-up unit 2, and demodulates the original video signal, a synchronization signal necessary for video signal playback, and an I-frame signal. The "I-frame signal" is a signal showing, for every frame, intra-frame compression was performed during MPEG compression. As described in embodiment 1, since decompression of frame images encoded according to the MPEG-2 encoding system is performed in the video demodulation circuit 64, no distinction can be made between I, P, and B in the video signal output from the video demodulation circuit 64. Therefore, to indicate the distinction, the I-frame signal indicating whether a frame is an I-frame is output from the video demodulation circuit 64.

As described above, the video signal recorded on the optical disk 1 is compressed according to the MPEG-2 system (ITU-T Recommendation H.262/ISO/IEC13818-2). In compression encoding according to the MPEG-2 system, each frame is determined to be an intra-frame compression (I-Picture), an inter-frame predictive frame (P-Picture), or a bidirectional predictive frame (B-picture). The intra-frame compression (I-Picture) in particular, though having a low compression efficiency, has a frequency characteristic that is superior to other frames, and has retained a large quantity of small-amplitude signal component that is noise and that was included in the video signal before compression. Since a large amount of this small-amplitude signal component is likely to be due to film grain, when pseudo-noise is generated in accordance with the small-amplitude signal in the intra-frame compression frame, the film grain of the original image can be faithfully reproduced.

Figure 25:
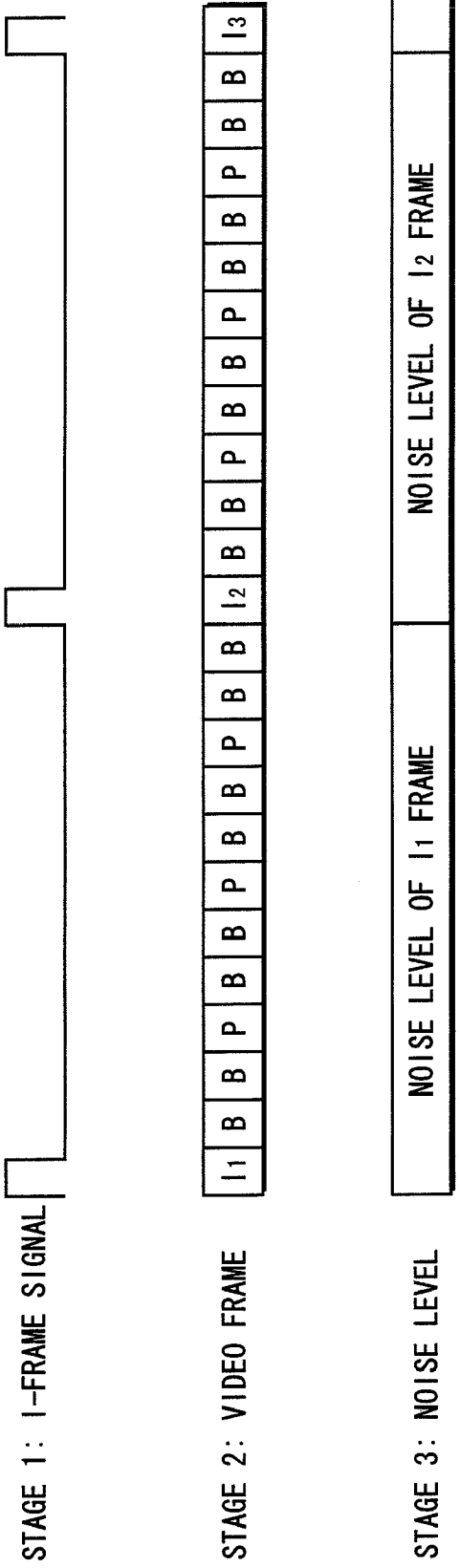
FIG. 25 shows frames in a video signal and an I-frame signal.

FIG. 25 shows frames in a video signal and an I-frame signal. Stage 2 shows the video signal. In the video signal, "I" indicates an intra-frame compression (I-Picture) frame, "P" indicates an inter-frame predictive frame (P-Picture), and "B" indicates a bidirectionally predictive frame (B-Picture). In this way, the intra-frame compression (I-Picture) appears periodically. Stage 1 shows the I-frame signal. The I-frame signal is "high" in the period that the intra-frame compression (I-Picture) appears in Stage 2, and otherwise is "low". The I-frame signal is demodulated by the video demodulation circuit 64, and output to the noise level judgment circuit along with the synchronization signal.

This completes the description of the video demodulation circuit 64. The following describes the details of the noise detection circuit 65 with reference to FIG. 25.

Noise Detection Circuit 65

Figure 26:
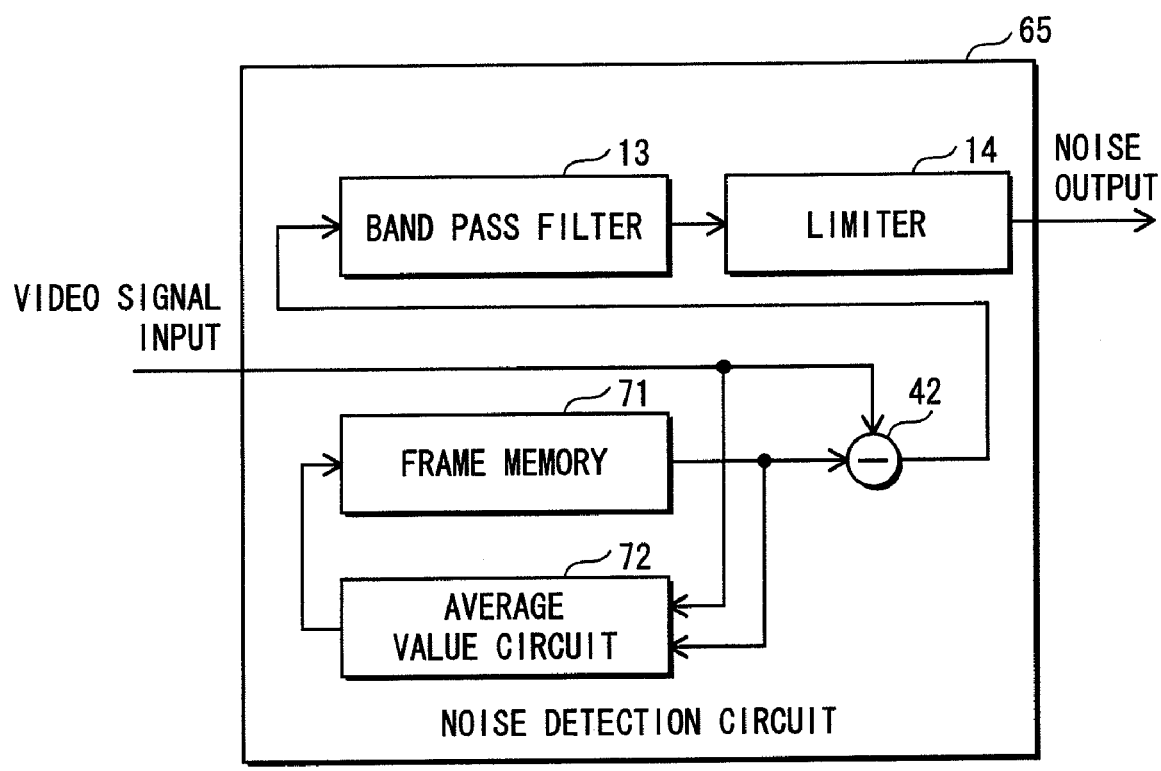
FIG. 26 shows an internal structure of a noise detection circuit 65 pertaining to embodiment 3 of the present invention.

FIG. 26 shows an internal structure of the noise detection circuit 65 pertaining to embodiment 3 of the present invention. The band pass filter 13 and the limiter 14 of FIG. 26 are the same as in embodiment 1, and the subtracter 42 is the same as in embodiment 2. The addition of a frame memory 71 and an averaging circuit 72 upstream of the subtracter 42 is new in FIG. 26. The following describes such constituent elements.

Detail 1: Frame Memory 71

The frame memory 71 is a memory for accumulating average values of frame images. Here, the average value of a frame image refers to the average value of pixel values per frame. Such average values of pixel values are obtained by performing an averaging operation on pixel values of frame images that have been input thus far.

Each time an input of a frame image is received, the averaging circuit 72 calculates an average value of storage content stored in the frame memory 71 and the input frame image, and with use of the average value, updates the storage content of the frame memory 71. Since the average value of the frame image is composed of the average value of pixel values per frame, the above update is performed by calculating the average value of pixel values stored in the frame memory 71 and pixel values in the input frame image, and writing the resulting average value to the frame memory 71.

The above average value is calculated for the following reason. There is no correlation between frame images in the small-amplitude signal component that is noise.

The average value circuit 72 calculates the average value of a frame image and stores the result in the frame memory 71 to obtain a frame image whose small-amplitude signal component that is noise has been suppressed. Then, the subtracter 42 calculates a difference between the video signal input and storage content of the frame memory 71, and outputs the difference to the band pass filter 13, thereby enabling acquiring an uncorrelated signal component in the frame. This enables only the uncorrelated frame signal to be sent to the band pass filter 13. As a result, the output of the limiter 14 includes only the small-amplitude component that is noise included in the original video signal, and the output of the noise detection circuit 65 acquired in this way is input to the noise removal circuit 6 and the noise level judgment circuit 68.

Supplying the uncorrelated frame signal to the band pass filter 13 and basing the noise level judgment thereon in this way enables the noise level to be more precisely generated.

Details of the Noise Level Judgment Circuit 68

Figure 27:
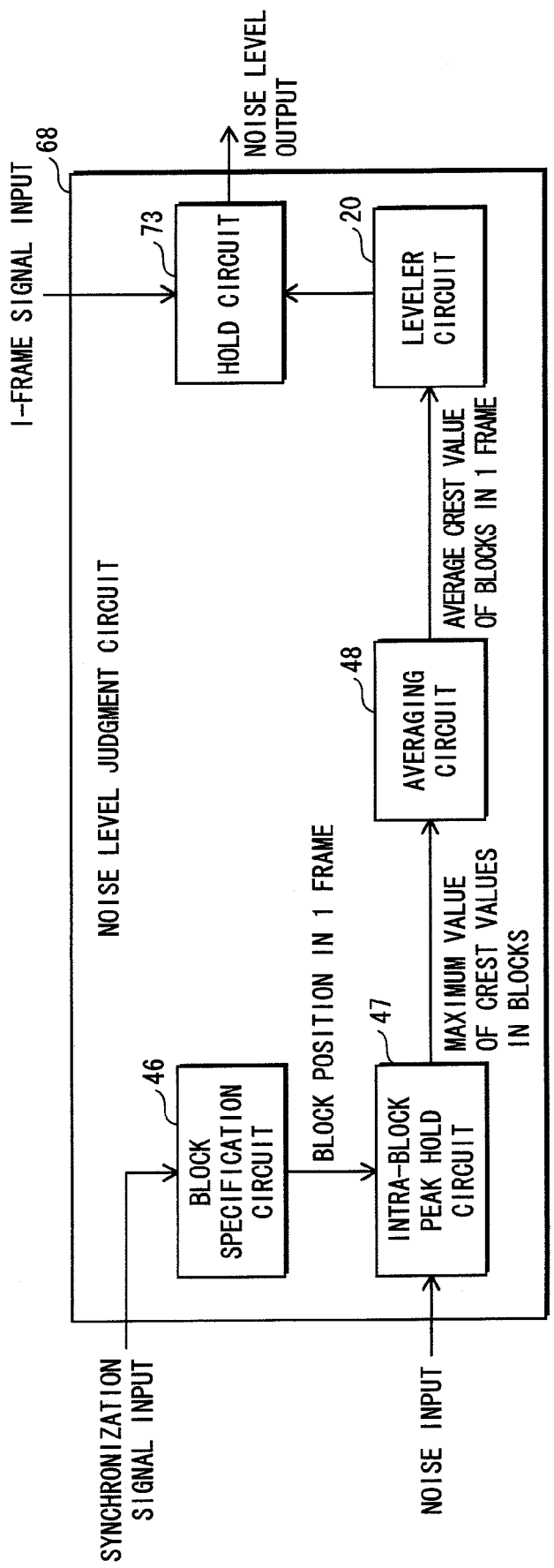
FIG. 27 shows an internal structure of a noise level judgment circuit 68.

FIG. 27 shows an internal structure of the noise level judgment circuit 68. In FIG. 27, "synchronization signal input" refers to a synchronization signal output from the video demodulation circuit 64, and "noise input" refers to a noise detection signal output from the noise detection circuit 65. "I-frame signal input" is an I-frame signal that was output from the video demodulation circuit 64. The leveler circuit 20 in FIG. 27 is the same as in embodiment 1, and constituent elements from the in-block specification circuit 46 to the averaging circuit 48 in the processing stream are the same as in embodiment 2 of the present invention. The fact that a hold circuit 73 exists downstream of the leveler circuit 20 is new in the present drawing. The following describes the hold circuit 73.

Detail 1: Hold Circuit 73

The hold circuit 73 holds the output of the leveler circuit 20 until a next period in which the I-Frame signal is "high". Holding the output of the leveler circuit 20 until the next period in which the I-Frame signal is "high" enables maintaining the noise level obtained from the intra-frame compression (I-Picture) until the next intra-frame compression (I-Picture). Stage 3 of FIG. 25 shows a period in which a noise level is held by the hold circuit 73. Here, in Stage 2, a noise level output for an $I_1$ frame, henceforth, is maintained while input of a B-frame and P-frame continues. In a similar way, a noise level output for an $I_2$ frame is maintained even while input of B-frames and P-frames continues. Noise level output obtained in this way is input to the pseudo-noise generation circuit 69 in FIG. 28. Accordingly, while input for an inter-frame compression frame continues, the pseudo-noise generation circuit 69 generates a pseudo-noise signal according to a noise level output for the intra-frame compression (I-Picture) frame.

This completes the description of the noise level judgment circuit 68. The following describes details of the pseudo-noise generation circuit 69 with reference to FIG. 28.

Details of Pseudo-Noise Generation Circuit 69

Figure 28:
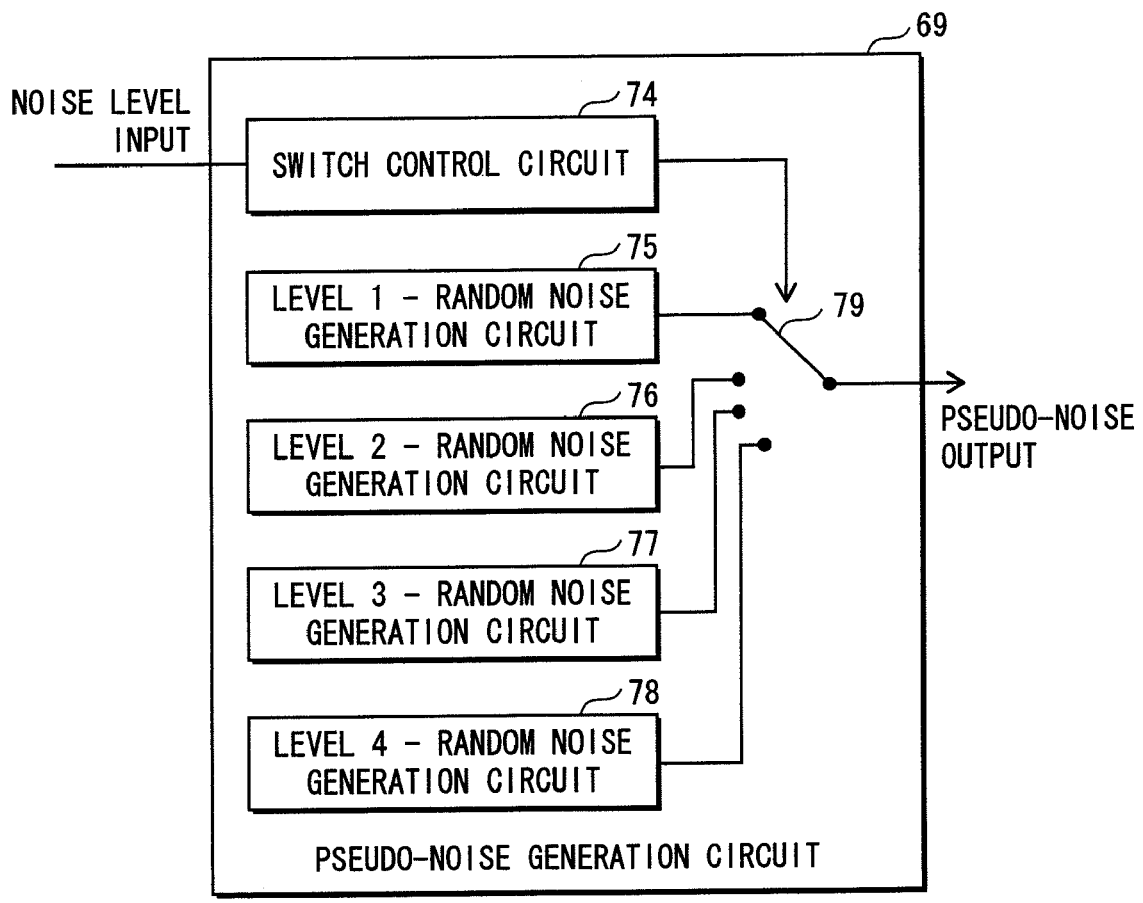
FIG. 28 shows an internal structure of a pseudo-noise generation circuit 69.

FIG. 28 shows an internal structure of the pseudo-noise generation circuit 69. In FIG. 28, a "noise level input" is a noise level signal output from the noise level judgment circuit 68. As shown in FIG. 28, the pseudo-noise generation circuit 69 is constituted from a switch control circuit 74, a level 1—random noise generation circuit 75, a level 2—random noise generation circuit 76, a level 3—random noise generation circuit 77, a level 4 -random noise generation circuit 78, and a switch 79. The following describes such constituent elements.

Detail 1: Switch Control Circuit 74

The switch control circuit 74 switches the switch 79 in accordance with a noise level input.

Detail 2: Level 1—Random Noise Generation Circuit 75

The level 1—random noise generation circuit 75 generates random noise having a frequency distribution of 1080 vertical lines and 1920 horizontal pixels, which is equivalent to an output resolution of the up-converter 7.

Detail 3: Level 2—Random Noise Generation Circuit 76

The level 2—random noise generation circuit 76 generates random noise having a frequency distribution of 1080 vertical lines and 1920 horizontal pixels, which is equivalent to the output resolution of the up-converter 7, and having a higher frequency distribution than the level 1—random noise generation circuit 75.

Detail 4: Level 3—Random Noise Generation Circuit 77

The level 3—random noise generation circuit 77 generates random noise having a frequency distribution of 1080 vertical lines and 1920 horizontal pixels, which is equivalent to the output resolution of the up-converter 7, and having a higher frequency distribution than the level 2—random noise generation circuit 76.

Detail 5: Level 4—Random Noise Generation Circuit 78

The level 4—random noise generation circuit 78 generates random noise having a frequency distribution of 1080 vertical lines and 1920 horizontal pixels, which is equivalent to the output resolution of the up-converter 7, and having a higher frequency distribution than the level 3—random noise generation circuit 77.

Detail 6: Switch 79

The switch 79 switches between output of the level 1—random noise generation circuit 75, the level 2—random noise generation circuit 76, the level 3—random noise generation circuit 77, and the level 4—random noise generation circuit 78.

The switch control unit 74 causes the switch 79 to select output of the level 1—random noise generation circuit 75 when the noise level input is 1, and the output of the level 2 random noise generation circuit 76 when the noise level is 2. The switch control unit 74 causes the switch 79 to select output of the level 3—random noise generation circuit 77 when the noise level input is 3, and the output of the level 4—random noise generation circuit 78 when the noise level is 4.

Pseudo-noise generated in this way is added, by the adder 10, to the output of the up-converter 7.

Figure 29:
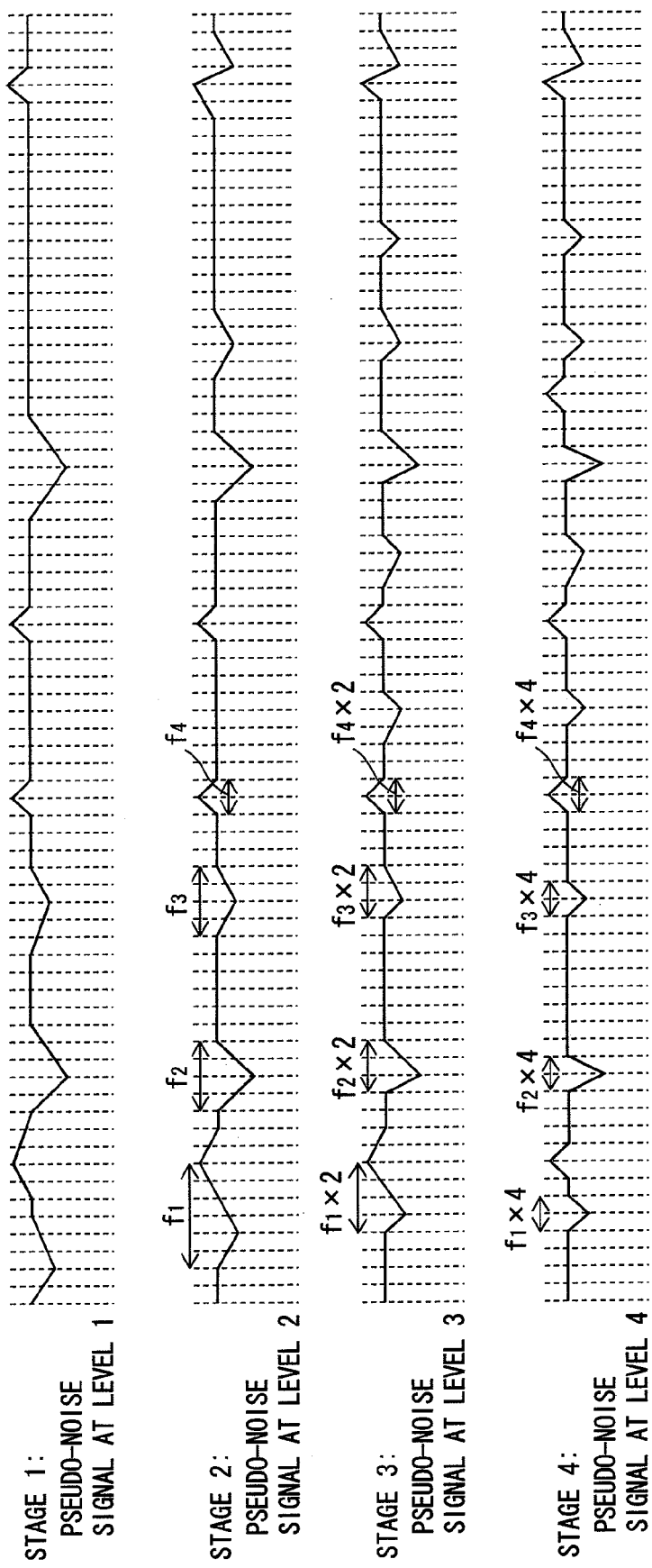
FIG. 29 shows types of pseudo-noise signals generated in accordance with settings of signal rates in a switch 79.

FIG. 29 shows pseudo-noise signals generated in accordance with settings of signal rates in a switch control circuit 79.

Stage 1 of FIG. 29 shows a pseudo-noise signal output from the level 1—random noise generation circuit 75 when the noise level is 1. Here, at noise level 1, the switch 79 selects a noise signal having a frequency distribution of 1080 vertical lines and 1920 horizontal pixels, which is equivalent to the output resolution of the up-converter 7.

Stage 2 shows a signal output at noise level 2. Noise having a higher frequency than the noise in Stage 1 (see f1, f2, f3) appears in the pseudo-noise signal in Stage 2. This is because, when the noise level is 2, the switch 79 selects noise having a frequency distribution higher than the level 1—random noise generation circuit 75.

Stage 3 shows a signal output when the noise level is 3. Noise having a higher frequency than the noise shown in stage 2 (see f1×2, f2×2, f3×2) appears in the pseudo-noise signal in Stage 3. This is because, at noise level 3, the switch 79 selects noise having a frequency distribution higher than the level 2—random noise generation circuit 76.

Stage 4 shows a signal output when the noise level is 4. Noise having a higher frequency than the noise shown in stage 3 (see f1×4, f2×4, f3×4) is represented in the pseudo-noise signal in Stage 4. This is because, at noise level 4, the switch 79 selects noise having a frequency distribution higher than the level 3—random noise generation circuit 77.

Video Signal Composited with Pseudo-Noise Signal

Figure 30:
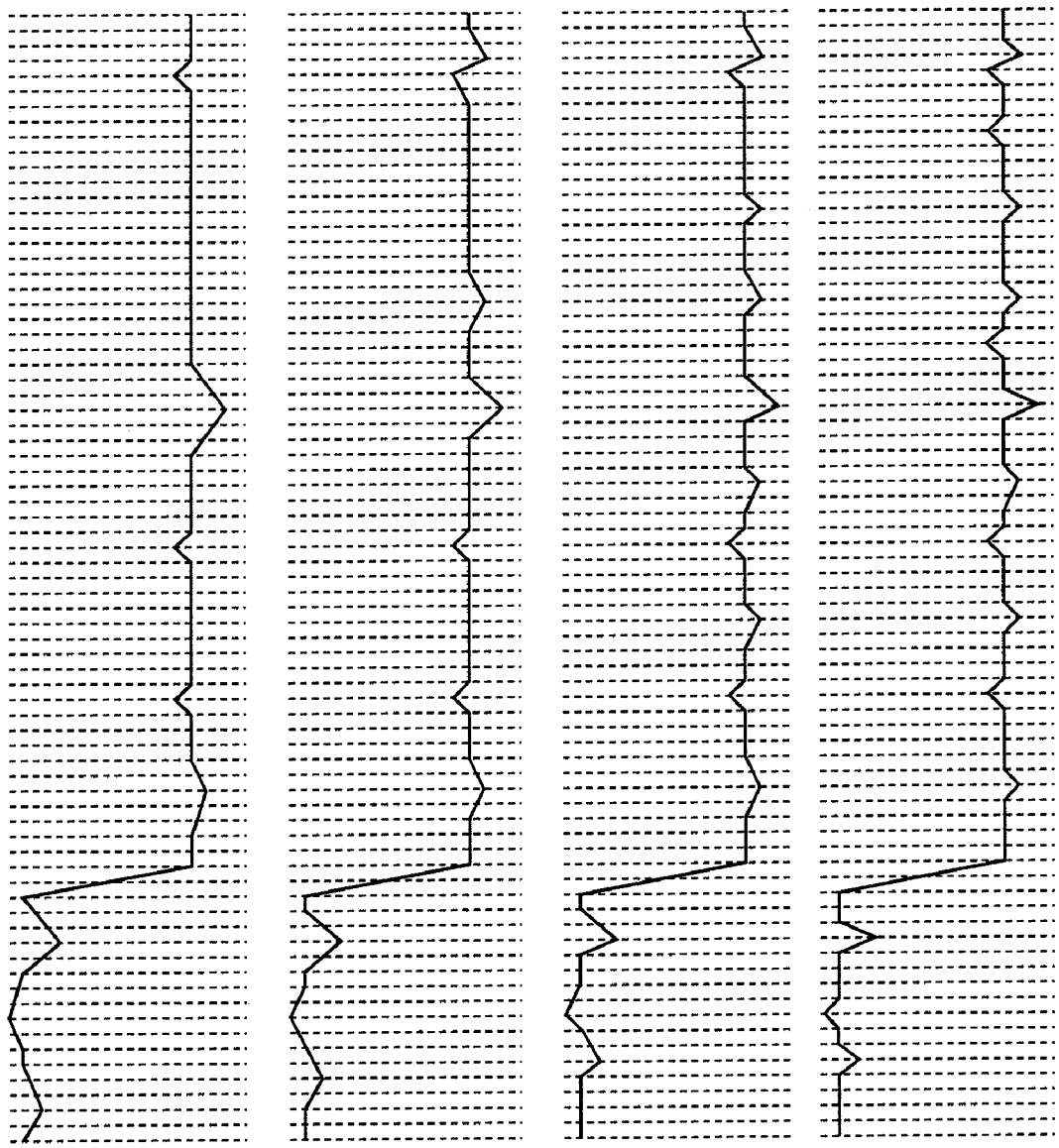
FIG. 30 shows a video signal to which a pseudo-noise signal has been added by an adder 10.

The following describes, with reference to FIG. 30, video signals sent by the above playback apparatus to the monitor.

FIG. 30 shows video signals to which pseudo-noise has been added by the adder 10. Stage 1 of FIG. 30 shows a video signal to which a pseudo-noise signal whose noise level is 1 has been added, and Stage 2 shows a video signal to which a pseudo-noise signal whose noise level is 2 has been added. Stage 3 shows a video signal to which a pseudo-noise signal whose noise level is 3 has been added. The pseudo-noise signals at noise level 1, noise level 2, and noise level 3 are the same as shown in the previous drawings. Since the noise level increases as the stages progress in the present drawing, a higher noise level indicates a higher frequency of noise appearing in the video signal.

As described above, in the present embodiment, if noise having large crest values exists in the original video signal before up-conversion, pseudo-noise having a corresponding frequency is composited with the video signal, thereby creating an atmosphere of a film image, even if there is not an exact correspondence with the film grain in the SD image. Also, simplification of circuit structure is possible to the extent that the positions of the film grains are not reflected, thereby contributing to development of a lower cost playback apparatus.

Embodiment 4

The leveler circuit 20 of embodiments 2 and 3 converts an average value of peak values of the blocks obtained by the averaging circuit 48 into a noise level. In contrast, the leveler circuit 20 in the present embodiment converts a peak value of an amount of noise for each block in one frame into a noise level. This enables conversion into a noise level to be performed in smaller units, and enables noise appearing in the video signal to be reproduced more precisely. Also, the circuit structure can be simplified since the averaging circuit 48 that calculates average values of peak values for the blocks is unnecessary, the circuit structure can be simplified.

Embodiment 5

The noise detection circuit 5 of embodiment 1 executes a series of processing per frame unit, including measuring an amount of noise, converting the amount of noise into a noise level, and generating and adding a pseudo-noise signal. However, in the present embodiment, this series of processing is executed per a unit consisting of a predetermined number of pixels. Specifically, each time that the amount of noise is measured and the noise level is converted for the predetermined number of pixels, the pseudo-noise signal is regenerated. This enables a pseudo-noise pattern added to the video signal by the adder 10 to change once in every predetermined number of pixels and the noise that exists in the video signal to be reproduced more precisely.

Supplementary Remarks

This concludes the description of the best modes of carrying out the invention known to the applicant at the time of application. However, further improvements and variations related to the technical topics indicated below can be added. Whether to carry out the invention as indicated in the embodiments or to use these improvements and variations is arbitrary, and is left to the discretion of the one who carries out the invention.

Image Resolution

In embodiments 1 and 3, an original video signal of 480 vertical lines and 720 horizontal pixels is converted into a high-definition image signal of 1080 vertical lines and 1920 horizontal pixels. Also, in embodiment 2 of the present invention, the original video signal of 480 vertical lines and 720 horizontal pixels is converted into a high-definition image signal of 720 vertical lines and 1280 horizontal pixels. However, the effects of the present invention can also be realized with an original video signal having another pixel structure, provided that the resolution conversion unit converts a video signal into a higher-resolution video signal. Specifically, similar effects can be realized in cases such as when an original video signal of 576 lines and 720 horizontal pixels is converted into 720 lines and 1280 horizontal pixels, an original video signal of 576 lines and 720 horizontal pixels is converted into 1080 lines and 1920 horizontal pixels, an original video signal of 720 lines and 1280 horizontal pixels is converted into 1080 lines and 1920 horizontal pixels, or an original video signal of 1080 lines and 1920 horizontal pixels is converted into a higher resolution such as 2160 lines and 4090 horizontal pixels.

Holding by the Peak Hold Circuit 19

The peak hold circuit 19 in the noise level judgment circuit 8 holds a crest value of noise and converts the crest value into a noise level. However, the peak hold circuit 19 may target a frequency area of the noise for holding. Then the frequency band may be converted into a noise level.

Target of Noise Measurement

Although in embodiments 1 to 3, a noise amount measurement part measures noise in a total amplitude band of a luminance signal, effects of the present invention can be achieved by measuring noise in a specified luminance band, even if the noise in the total amplitude band of the luminance signal is not measured, or by using a chrominance signal instead of a luminance signal as the signal whose noise is measured.

Omission of Constituent Elements

Figure 31:
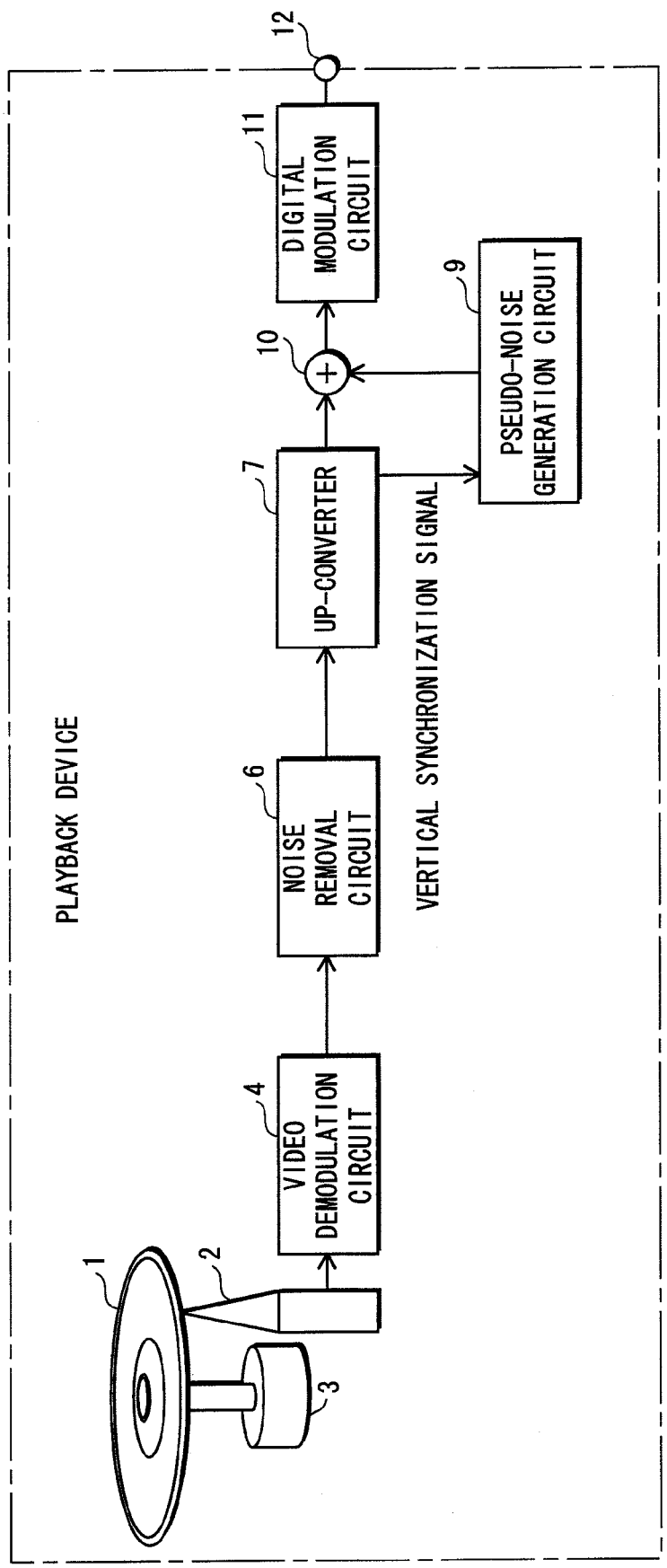
FIG. 31 shows an internal structure of a playback apparatus from which the noise detection circuit 5 and the noise level judgment circuit 8 have been omitted.

The playback apparatus shown in FIG. 1 may have a structure in which the noise detection circuit 5 and the noise level judgment circuit 8 are omitted. In this case, the internal structure of the playback apparatus is as shown in FIG. 31. In the internal structure of FIG. 31, although the position and size of the film grains are not accurately reflected in the video image, merely adding a pseudo-noise signal creates the atmosphere of the film grain. Noise may be left in the original signal, and pseudo-noise may be composited in addition thereto.

Delay of Pseudo-Noise Signal

Processing is performed to detect peak values of noise in a given frame, a pseudo-noise signal is generated in accordance with the peak values, and the pseudo-noise signal is added to the next frame after the given frame. Since scanning all of the lines in one frame is necessary to determine which noise in the frame corresponds to which peak values, the fact that there is one frame of delay between a frame that is targeted for noise detection and a frame that is targeted for adding a pseudo-noise signal is undeniable. To eliminate this delay, decoding is performed on video data accumulated in a buffer, the video signal for one line is obtained, and individual pixel values in the video signal are held. After a noise level has been measured for the pixel values of the video signal and a pseudo-noise signal has been generated in accordance with the noise level, the pseudo-noise signal is added to the held pixel values of the video signal. This processing eliminates the delay of a frame described above.

Position of Film Grains

In the embodiments, since a random noise signal is generated regardless of the positions of film grains in the video signal, the positions of the film grains are not faithfully reproduced. If the positions of pixels existing in noise in one line of video signal are held, and processing is performed to arrange pseudo-noise according to positions of the held pixels in individual up-converted lines, reproducibility of the film grains can be increased.

Pseudo-Noise Generation Based on a Video Signal

Although pseudo-noise is generated by a separate system from the video signal in the embodiments, pseudo-noise may be generated by the same system as the video signal. Specifically, pseudo-noise may be generated with use of a part of the video signal. Specifically, pseudo-noise may be generated in accordance with a pixel obtained from a specified area of a frame image. The pseudo-noise is therefore related to content of the image.

Expansion to a Recording Device

If the constituent elements shown in embodiments 1 to 3 are provided in a recording device, when the recording device records a video signal to an optical disk, pseudo-noise generation may be performed along with the up-conversion described above, and a video signal which has been composited with the pseudo-noise may be recorded to the optical disk. This is especially advantageous when inputting an SD image and recording to an optical disk such as a BD-RE or HD-DVD, which are intended for the recording of an HD image. Also, when recording an optical disk in this way, adding pseudo-noise in advance enables creating a high-definition feel even when the video signal is played back in a playback apparatus that is not intended for the generation of pseudo-noise.

Also, read-only optical disks may be mass-produced by using an up-converter used at an authoring location to generate pseudo-noise such as is described above, composite the pseudo-noise with a video signal, and record the composited video signal to a master optical disk.

System LSI

The essential parts of the present invention are the up-converter 7 and the circuits peripheral thereto (the noise detection circuit 5, the noise removal circuit 6, the noise level judgment circuit 8, and the pseudo-noise generation circuit 9). These essential parts of the playback apparatus may be configured separately as a system LSI.

A system LSI refers to a package in which a bare chip has been mounted on a high-density substrate. A system LSI also refers to a package in which two or more bare chips have been given the outward construction of a single LSI by mounting the bare chips on a high-density substrate. (This kind of system LSI is called a multi-chip module).

Focusing now on the types of packages, system LSIs include QFP (quad flat packages) and PGA (pin grid arrays). A QFP is a system LSI in which pins are attached to the four-sides of the package. A PGA is a system LSI in which a majority of the pins are attached to the bottom of the package.

These pins act as interfaces to other circuits. Given that the pins in a system LSI have this role as interfaces, the system LSI acts as the core of the playback apparatus by connecting the pins to other circuits.

The system LSI can be incorporated not only in a playback apparatus, various devices capable of video playback, such as a television, game console, personal computer, or "One-Seg" mobile phone.

Figure 32:
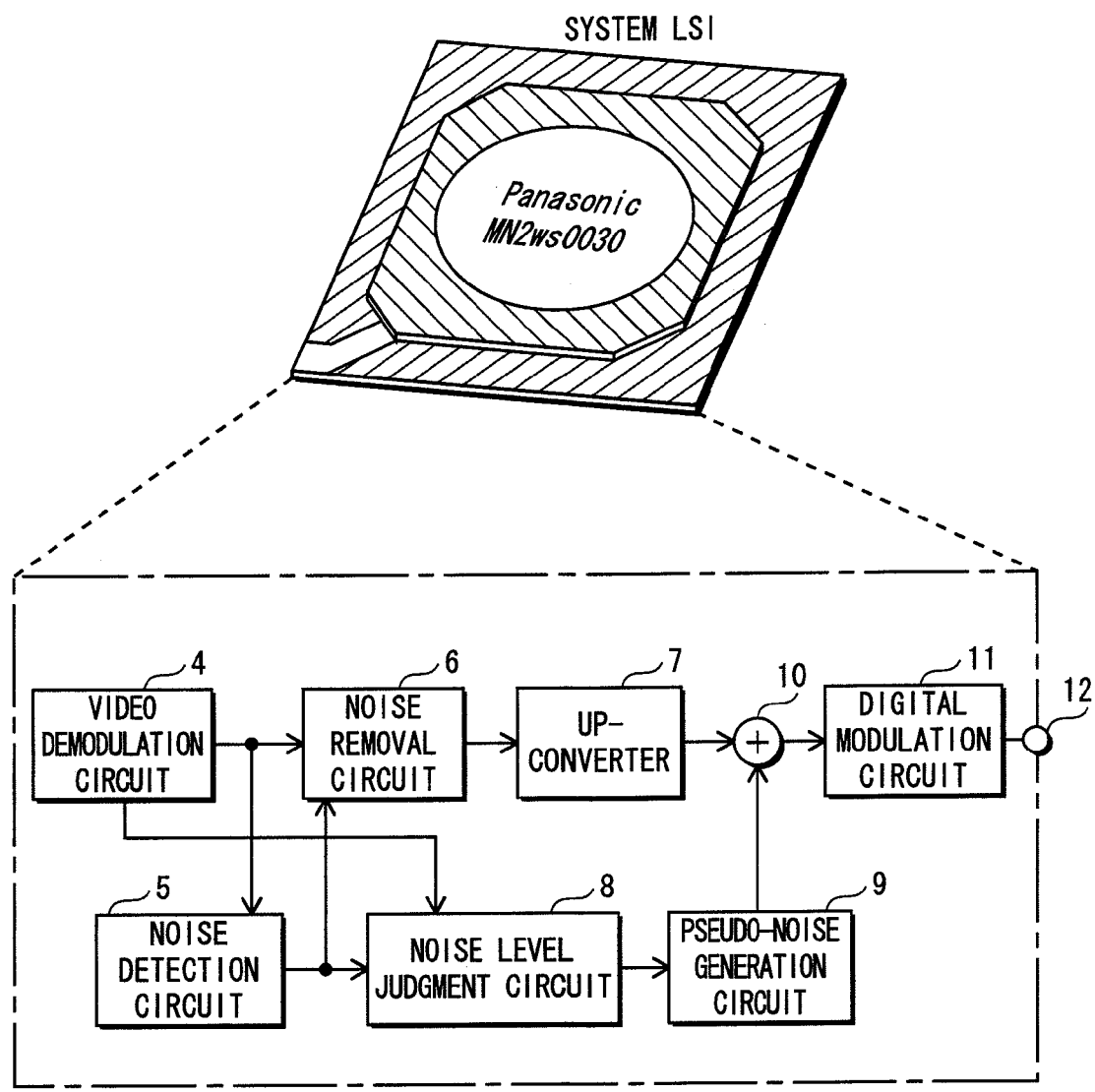
FIG. 32 schematically shows a system LSI pertaining to the present invention.

FIG. 32 schematically shows a system LSI of the present invention. As shown in FIG. 32, the system LSI of the present invention includes the code RAM, CPU and RAM described above in a package.

The following are details of specific production procedures. First, a circuit diagram of portions to be included in the system LSI is created based on the structure diagram shown in the embodiments, and the constituent elements in the structure diagrams are realized using circuit elements, ICs and LSIs.

Buses connecting the circuit elements, ICs and LSIs, as well as interfaces with peripheral circuits and external devices are defined as the constituent elements are realized. Furthermore, connection lines, power lines, ground lines, clock signal lines and the like are defined. In these definitions, the operation timings of each constituent element are adjusted taking in account the specifications of the LSI, and other adjustments, such as ensuring the bandwidth necessary for each constituent element, are made as well. The circuit diagram is thus completed.

After the circuit diagram is completed, implementation designing is performed. Implementation designing refers to the creation of a substrate layout that determines where on the substrate to place the parts (circuit elements, ICs, LSIs) in a circuit diagram created by circuit designing, and how to wire connection lines in the circuit diagram on the substrate.

Here, the implementation designing includes automatic placing and automatic wiring.

When a CAD apparatus is used, automatic placing can be achieved with use of a dedicated algorithm called "centroid method". In the automatic wiring, connection lines that connect the pins of parts in the circuit diagram are defined using metal foils and vias. When using a CAD apparatus, this wiring process can be achieved using dedicated algorithms called "maze method" and "line-search method".

Figure 33:
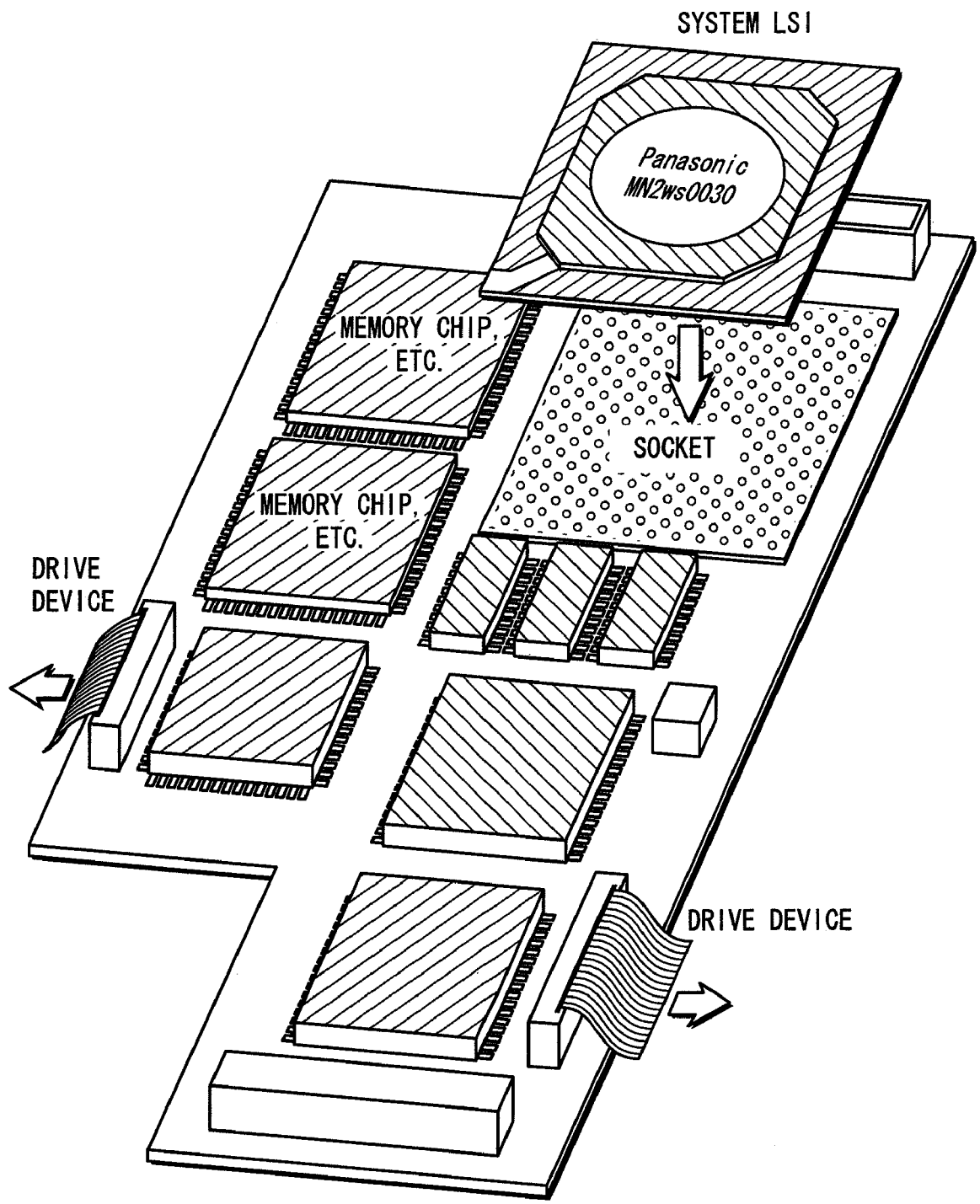
FIG. 33 schematically shows an incorporation of the system LSI pertaining to the present invention.

After the implementation designing is performed and the layout on the substrate is determined, the implementation designing results are converted into CAM data, and the CAM data is output to an NC machine tool etc. An NC machine tool performs SoC (System on Chip) implementation or SiP (System in Package) implementation based on the CAM data. SoC implementation a technique for fusing a plurality of circuits to a single chip. SiP implementation is a technique for using resin or the like to form a plurality of chips into a single package. Incorporating a system LSI formed this way in a playback apparatus, as shown in FIG. 33, enables production of the playback apparatus shown in the embodiments described above.

Note that an integrated circuit generated as described above may also be referred to as an IC, an LSI, a super LSI, or an ultra LSI, depending on the degree of integration.

Furthermore, all or some of the constituent elements of the control apparatuses may be constituted as a single chip. The integration is also not limited to SoC and SiP implementation, but instead may be realized by a dedicated circuit or a general-purpose process. After LSI manufacture, the use of a field programmable gate array (FPGA) or a silicon flexible processor in which the connection and settings of circuit cells in the LSI can be restructured is possible. Furthermore, if integration technology is developed that replaces LSIs due to progressive or derivative semiconductor technology, integration of functional blocks using this technology is naturally possible. For example, the application of biotechnology is a possibility.

Also, it is preferable to design the general parts of the internal structures of the embodiments by combining intellectual property defined as pre-existing circuit patterns. For the characteristic parts, it is preferable to perform top-down design with use of descriptions of a high level of HDL abstraction or a register transfer level.

In FPGA, a plurality of logic elements are disposed in a lattice pattern, and connecting wiring vertically and horizontally in accordance with input/output composites listed in a LUT (Look Up Table) enables realizing the hardware structure indicated in the embodiments. LUTs are stored in an SRAM, and since contents of the SRAM are lost when the power is turned off, it is necessary when using FPGA to write the LUTs that realize the hardware structure indicated in the embodiments to the SRAM in accordance with a definition in the configuration information. Furthermore, it is preferable to realize an image demodulation circuit that stores a decoder internally by a DSP that includes a product-sum operation function.

Architecture

Since the system LSI of the present invention is assumed to be integrated in a playback apparatus, it is desirable to make the system LSI compliant with UniPhier architecture.

A system LSI that is compliant with UniPhier architecture is constituted from the following circuit blocks.

Data Parallel Processor (DPP)

This is a SIMD-type processor in which a plurality of element processors operate identically and, by causing the computing units in the element processors to operate at the same time with a single instruction, achieves parallel decoding processing on a plurality of pixels that compose a picture.

Instruction Parallel Processor (IPP)

The instruction parallel processor is constituted from an instruction RAM, an instruction cache, a data RAM, a "Local Memory Controller" composed of a data cache, an instruction fetch unit, a decoder, an execution unit, a "Processing Unit" composed of a register file, and a "Virtual Multi Processor Unit" that causes the Processing Unit to perform parallel execution of a plurality of applications.

CPU Block

The CPU block is constituted from an ARM core, an external bus interface (Bus Control Unit: BCU), a DMA controller, a timer, and a vector interruption controller that are peripheral circuits, and peripheral interfaces such as an UART, a GPIO (General Purpose Input Output), and a synchronization serial interface. The controller described above is implemented in a system LSI as the CPU block.

Stream I/O Block

The stream I/O block performs data input/output between a drive device, a hard disk drive device, and an SD memory card drive device connected on an external bus, via a USB interface or an ATA packet interface.

AV I/O Block

The AV I/O block is composed of an audio input/output, a video input/output, and an OSD controller, and performs data input and output with a television and an AV amp.

Memory Control Block

This is a block that realizes reading/writing from/to an SD-RAM connected via an external bus, and is composed of an internal bus connection unit that controls internal connections between the blocks, an access control unit that performs data transfers to/from the SD-RAM externally connected to the system LSI, and an access schedule unit that adjusts SD-ROM access requests from the blocks.

When manufacturing a system LSI compliant with this architecture, it is preferable to employ a bottom-up style of layout technique, which involves performing layout design for each circuit block such as the IPP and DPP, optimizing performance of the circuit blocks, and assembling the blocks, in order to complete a 1-chip layout for each block.

User Operation

A pseudo-noise signal may be added upon receiving a setup operation from a user. This set-up operation includes settings for a "texture priority mode" and a "texture non-priority mode".

The "texture priority mode" is a mode in which a pseudo-noise signal is generated by the pseudo-noise generation circuit 9, and the film grain is reproduced by adding the pseudo-noise signal to the video signal. Upon executing this mode, pseudo-noise appears in the video signal to be output by the leveler circuit 20.

"Texture non-priority mode" is a mode in which a pseudo-noise signal is not generated by the pseudo-noise generation circuit 9, and the film grain is not reproduced. Upon executing this mode, the up-converter 7 targets, for up-conversion, a video signal from which noise has been removed by the noise removal circuit 6.

Figure 34:
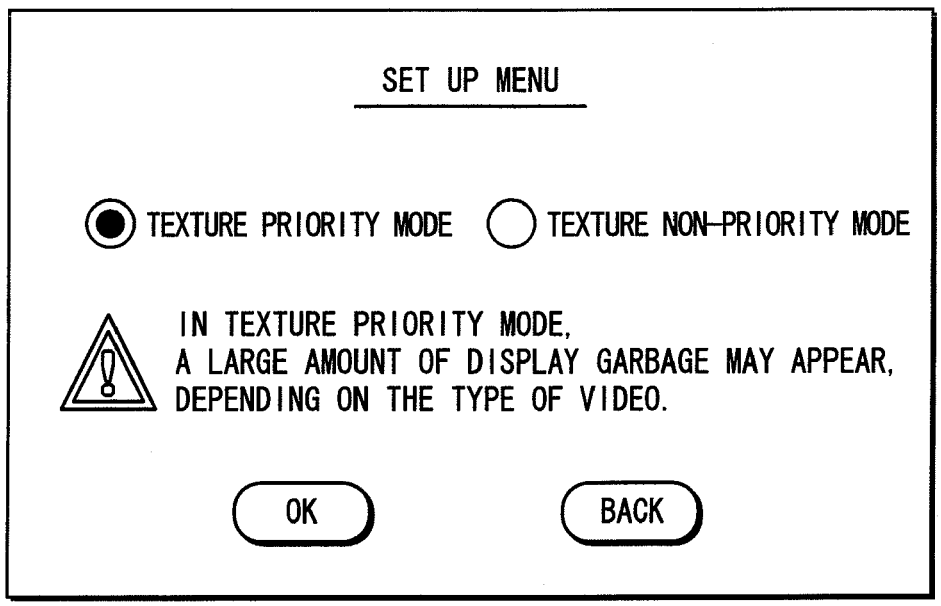
FIG. 34 shows an exemplary set-up menu.

FIG. 34 shows an exemplary set-up menu such as described above. The buttons in FIG. 34 are for receiving settings for the "texture priority mode" and the "texture non-priority mode", and each has a "normal state," a "focus state", and an "active state". This menu is composed using OSD (On Screen Display) graphics and BML (Broadcast Markup Language).

The user can press left and right keys on a remote control to switch the button to be in the focus state, and by pressing the enter key, can change the current mode of the playback apparatus to the mode corresponding to the button currently in the focus state. The most significant characteristic of this GUI is informing the user of the drawback to setting the playback apparatus to the texture priority mode. A warning in the drawing, "In texture priority mode, a large amount of display garbage may appear depending on the type of video" displays the drawback of the texture priority mode. Texture priority mode is set as the default focus state after the user has been informed the drawback of setting the playback apparatus to the texture priority mode. Therefore, even an amount of display garbage that is extreme in the texture priority mode will not lead to a product complaint, since the user has been informed that the amount of noise may actually increase depending on the video content.

Figure 35:
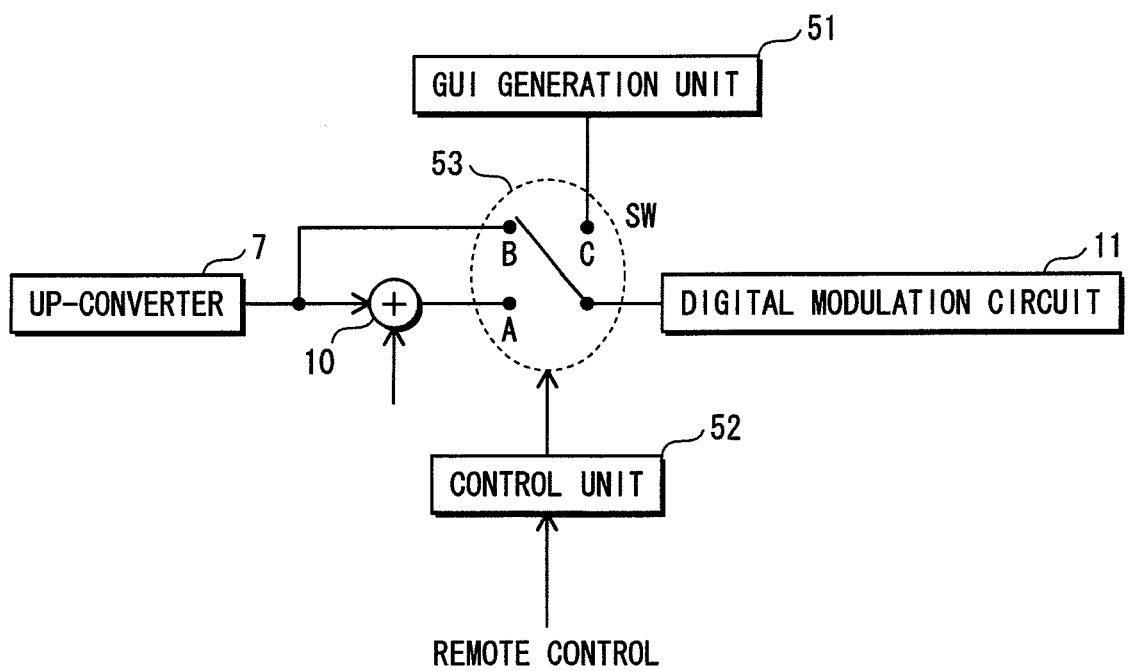
FIG. 35 shows constituent elements (a GUI generation unit 51, a control unit 52, a switch 53) added to the playback apparatus shown in embodiment 1 in order to display the menu of FIG. 34.

FIG. 35 shows constituent elements (a GUI generation unit 51, a control unit 52, a switch 53) added to the playback apparatus shown in embodiment 1 in order to display the menu of FIG. 34.

The GUI generation unit 51 generates the menu of FIG. 34.

When a user operates a remote control to call up the menu of FIG. 34, the control unit 52 switches the switch 53 to terminal C. This causes the menu of FIG. 34 generated by the GUI generation unit 51 to be output to the television. Next, if the operation of the remote control setting is "texture priority mode", the control unit 52 causes the switch 53 to switch to terminal A. This causes the video signal, to which noise has been added by the adder 10, to be output. Similarly, if the operation of the remote control is "texture non-priority mode", the control unit 52 causes the switch 53 to switch to terminal B. This causes a video signal that has been up-converted by the up-converter 7 to be output. Similarly, adding the GUI generation unit 51, the control unit 52, and the switch 53 to the playback unit of embodiment 2 (FIG. 14) or the playback unit of embodiment 3 (FIG. 24) enables switching between texture priority mode and texture non-priority mode in these embodiments.

INDUSTRIAL APPLICABILITY

The above embodiments disclose internal structures of a playback apparatus of the present invention. Since the playback apparatus can obviously be mass-produced according to the internal structure, the device is industrially applicable. Therefore, a playback apparatus of the present invention can be applied to development of products in the field of DVD±R players, DVD+R recorders, hard disk recorders, video recorders using a broadcast receiver or a semiconductor memory, etc.

The invention claimed is:

1. A playback apparatus comprising:
    a conversion unit operable to increase a resolution of a frame image in a video signal;
    a generation unit operable to generate a pseudo-noise signal based on the resolution of the frame image in the video signal and including pseudo-noise used as a film grain, the resolution of the frame image in the video signal that the generation unit generates the pseudo-noise signal upon being increased by the conversion unit; and
    a composition unit operable to composite the pseudo-noise signal generated by the generation unit with the video signal and form the film grain on the video signal for display, the resolution of the frame image in the video signal that the composition unit composites with the pseudo-noise signal being increased by the conversion unit.

2. The playback apparatus of claim 1, wherein
    the pseudo-noise in the pseudo-noise signal has a characteristic that approximates a characteristic of noise included in the video signal before the conversion unit increases the resolution of the frame image in the video signal.

3. The playback apparatus of claim 2, further comprising:
a judgment unit operable to judge a noise level in the pre-conversion video signal before the conversion unit increases the resolution of the frame image in the video signal, wherein
the characteristic of the noise is approximated by control of a crest value of the pseudo-noise according to the noise level that is a judgment result of the judgment unit.

4. The playback apparatus of claim 3, wherein
the generation unit generates the pseudo-noise signal by generating a random noise signal in which noise is distributed at a same resolution as the resolution of the frame image in the video signal, and multiplying a crest value of the noise in the random noise signal by a coefficient corresponding to the noise level that is the judgment result.

5. The playback apparatus of claim 3, wherein
the noise in the video signal before the conversion unit increases the resolution of the frame image in the video signal is a small-amplitude component in a specified frequency band of the video signal, and
the judgment unit is further operable to hold a crest value of a small-amplitude component for each frame image, judge, out of a plurality of noise levels, a noise level that corresponds to the held crest level, and output the corresponding noise level as the judgment result.

6. The playback apparatus of claim 2, further comprising:
a judgment unit operable to judge a noise level in the video signal before the conversion unit increases the resolution of the frame image in the video signal, wherein
the characteristic of the noise is approximated by control of an amount of pseudo-noise in the video signal according to the noise level that is a judgment result of the judgment unit.

7. The playback apparatus of claim 6, wherein
the generation unit includes
a generation sub-unit operable to generate a random noise signal in which noise is distributed at a same resolution as the resolution of the frame image in the video signal, and
a selection sub-unit operable to select, from among noise crest values in the random noise signal, noise crest values to be included as the pseudo-noise in the pseudo-noise signal, wherein
a ratio of selected noise crest values to unselected noise crest values is varied according to the noise level that is the judgment result of the judgment unit.

8. The playback apparatus of claim 6, wherein
the noise in the video signal before the conversion unit increases the resolution of the frame image in the video signal is a small-amplitude component in a specified frequency band of the video signal, and exists in one or more pixel blocks constituting a difference between frame images, and the judgment unit is further operable to calculate, for each frame image, an average value of a crest value of each pixel block, judge an average value that is a calculated crest value from among a plurality of stages of noise levels, and output the corresponding average value.

9. The playback apparatus of claim 2, further comprising:
a judgment unit operable to judge a noise level in the video signal before the conversion unit increases the resolution of the frame image in the video signal, and wherein
the characteristic of the noise is approximated by control of a frequency of pseudo-noise according to the noise level that is a judgment result of the judgment unit.

10. The playback apparatus of claim 9, wherein
the generation unit generates the pseudo-noise signal by generating a random noise signal in which noise is distributed at a same resolution as the resolution of the frame image in the video signal, and corresponding frequencies of individual noise in the random noise signal to the noise level that is the judgment result of the judgment unit.

11. The playback apparatus of claim 9, wherein
the video signal before the conversion unit increases the resolution of the frame image in the video signal is a signal that has been compressed by, for each frame, selecting one of intra-frame compression and inter-frame compression, and decoded, and
during a continuous series of inter-frame compressed frames, the judgment unit holds a noise level judged for an intra-frame compressed frame.

12. The playback apparatus of claim 1, further comprising:
a removal unit operable to remove noise included in the video signal before the conversion unit increases the resolution of the frame image in the video signal, wherein
the composite unit composites the pseudo-noise with the video signal from which the noise has been removed.

13. The playback apparatus of claim 1, wherein
user selection of one of a first mode in which film texture is reproduced and a second mode in which film texture is not reproduced is received and set as an operation mode of the playback apparatus, and
the compositing of the pseudo-noise by the composition unit is performed when the first mode has been set as the operation mode.

14. A playback apparatus configured to increase the resolution of frame images in a video signal to obtain a converted video signal, and, when increasing the resolution of the frame images is configured to receive a user selection of one of a first mode in which film texture is reproduced and a second mode in which film texture is not reproduced, and sets the user selection as an operation mode, wherein
when the operation mode has been set to the first mode, a pseudo-noise signal including pseudo-noise used as a film grain generated based on the increased resolution of the converted video signal is composited with the converted video signal to form film grain on the converted video signal for display.

* * * * *